United States Patent
Roberts

(10) Patent No.: US 12,110,980 B2
(45) Date of Patent: Oct. 8, 2024

(54) PRESSURE-BALANCED GATE VALVE

(71) Applicant: TECH ENERGY PRODUCTS, L.L.C., Bossier City, LA (US)

(72) Inventor: Todd Roberts, Bossier City, LA (US)

(73) Assignee: TECH ENERGY PRODUCTS, L.L.C., Bossier City, OK (US)

( * ) Notice: Subject to any disclaimer, the term of this patent is extended or adjusted under 35 U.S.C. 154(b) by 330 days.

(21) Appl. No.: 17/472,260

(22) Filed: Sep. 10, 2021

(65) Prior Publication Data

US 2022/0074502 A1 Mar. 10, 2022

Related U.S. Application Data

(60) Provisional application No. 63/076,580, filed on Sep. 10, 2020, provisional application No. 63/076,638, filed on Sep. 10, 2020.

(51) Int. Cl.
*F16K 3/36* (2006.01)
*F16K 3/02* (2006.01)
*F16K 39/04* (2006.01)

(52) U.S. Cl.
CPC .............. *F16K 3/36* (2013.01); *F16K 3/0209* (2013.01); *F16K 39/04* (2013.01); *Y10T 137/8696* (2015.04)

(58) Field of Classification Search
CPC .......... F16K 3/36; F16K 3/0209; F16K 39/04; Y10T 137/8696
USPC ............. 137/630.12; 251/326–329, 355, 282
See application file for complete search history.

(56) References Cited

U.S. PATENT DOCUMENTS

| | | | | |
|---|---|---|---|---|
| 745,774 A | * | 12/1903 | Brady | F16K 39/04 137/630.12 |
| 2,923,310 A | * | 2/1960 | Eckert, Jr. | F16K 3/36 137/246.13 |
| 3,256,897 A | * | 6/1966 | 061966 | F16K 3/02 251/327 |
| 3,614,061 A | * | 10/1971 | Fitzpatrick | F16K 3/0263 251/327 |
| 3,768,774 A | * | 10/1973 | Baugh | F16K 27/044 251/327 |
| 3,770,247 A | | 11/1973 | Nelson | |

(Continued)

FOREIGN PATENT DOCUMENTS

CN 202834138 U 3/2013
WO 2008141545 A1 11/2008

OTHER PUBLICATIONS

Petrovalves: Pressure Seal Gate Valves—Valves and Actuators; Manufacturing Plant, Castellanza VA, Italy, https://www.petrolvalves.com/upload/product-pdf/PRESSURE-SEAL-GATE-VALVES.pdf.

*Primary Examiner* — John Bastianelli
(74) *Attorney, Agent, or Firm* — HAYNES AND BOONE, LLP

(57) ABSTRACT

A gate valve and method according to which a gate body extends within a valve cavity, a fluid bore extends through the gate body, and a passage extends from the fluid bore, through the gate body, and to the valve cavity. The valve cavity is pressurized with a lubricant to prevent, or at least resist, solid particles (e.g., sand, fines, debris, etc.) from entering the valve cavity. The valve cavity and the fluid bore are pressure balanced. In some embodiments, a flow valve, such as a check valve or one-way valve, is positioned within the passage.

14 Claims, 16 Drawing Sheets

(56) References Cited

U.S. PATENT DOCUMENTS

| | | | | |
|---|---|---|---|---|
| 4,177,833 | A | * | 12/1979 | Morrison .............. F16K 5/0673 |
| | | | | 137/625.12 |
| 4,230,299 | A | | 10/1980 | Pierce, Jr. |
| 4,281,819 | A | | 8/1981 | Linder |
| 4,678,008 | A | * | 7/1987 | Gyongyossy ........... F16K 39/04 |
| | | | | 137/630.12 |
| 5,370,155 | A | * | 12/1994 | Gyongyossy ........... F16K 39/04 |
| | | | | 137/630.12 |
| 8,695,637 | B2 | | 4/2014 | McBride |
| 8,915,480 | B2 | | 12/2014 | Jakobsen |
| 9,273,796 | B2 | | 3/2016 | Jakobsen et al. |
| 9,395,002 | B2 | * | 7/2016 | McEvoy ................. F16K 39/04 |
| 9,976,663 | B2 | | 5/2018 | Pozzati |
| 10,247,048 | B2 | | 4/2019 | Eisenmenger et al. |
| 2003/0116733 | A1 | | 6/2003 | Hoang et al. |
| 2010/0170571 | A1 | * | 7/2010 | Anderson ............. F16K 15/042 |
| | | | | 137/511 |
| 2014/0007966 | A1 | | 1/2014 | McBride |
| 2017/0234442 | A1 | | 8/2017 | Pozzati |

\* cited by examiner

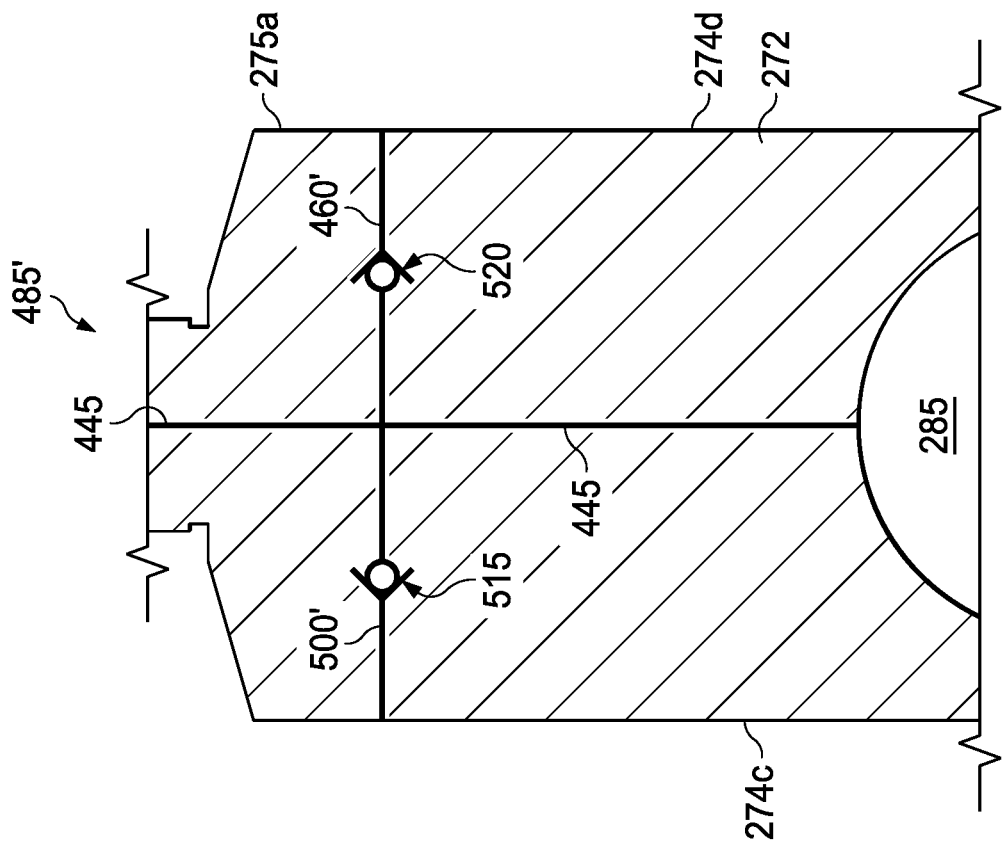
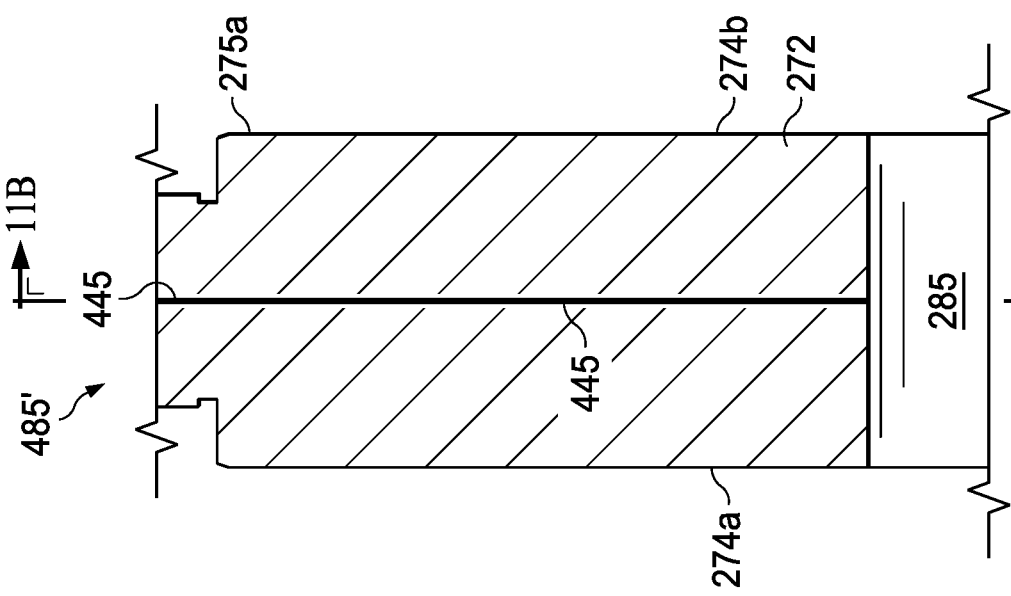
Fig. 11B
Fig. 11A

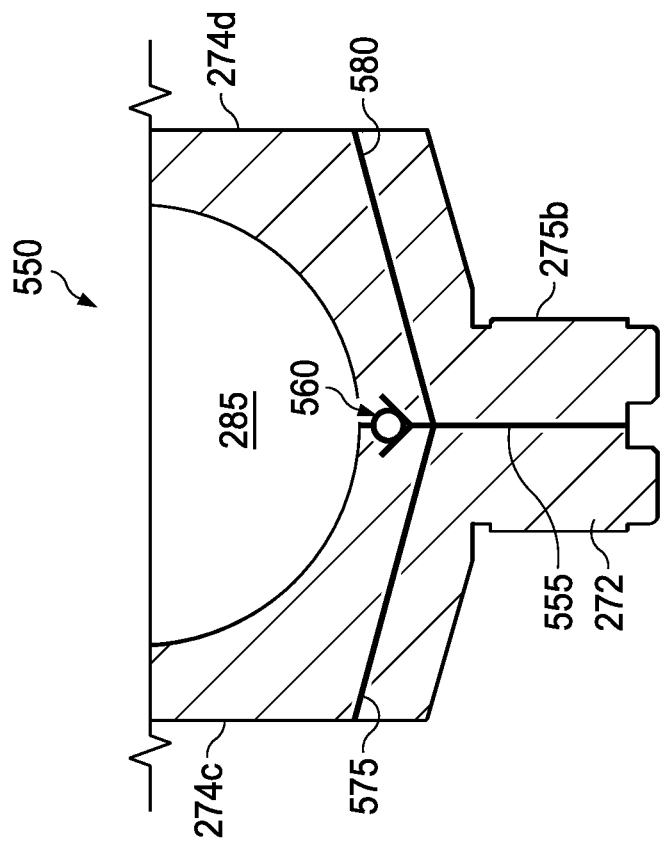
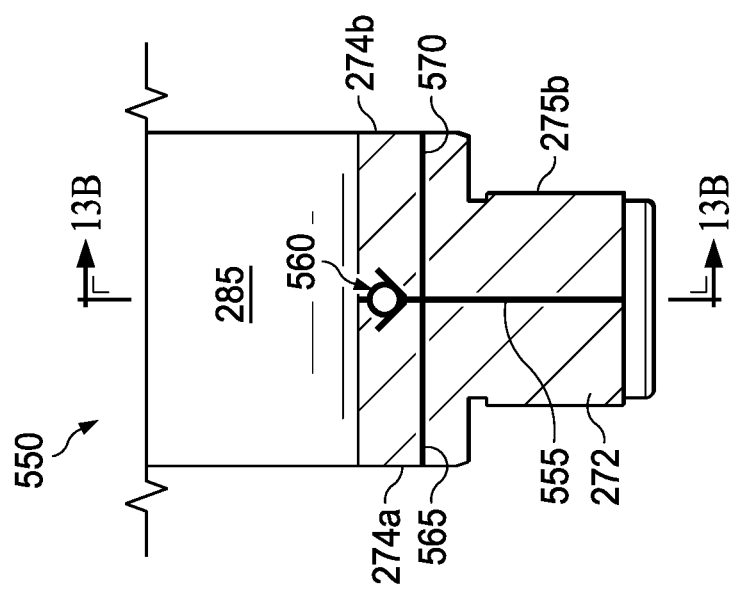
Fig. 13B
Fig. 13A

PRESSURE-BALANCED GATE VALVE

CROSS-REFERENCE TO RELATED APPLICATIONS

This application claims the benefit of the filing date of, and priority to, U.S. Application No. 63/076,638, filed Sep. 10, 2020, the entire disclosure of which is hereby incorporated herein by reference.

This application also claims the benefit of the filing date of, and priority to, U.S. Application No. 63/076,580, filed Sep. 10, 2020, the entire disclosure of which is hereby incorporated herein by reference.

This application is related to U.S. Application No. 62/899,990, filed Sep. 13, 2019, the entire disclosure of which is hereby incorporated herein by reference.

This application is also related to U.S. Application No. 62/901,458, filed Sep. 17, 2019, the entire disclosure of which is hereby incorporated herein by reference.

TECHNICAL FIELD

The present disclosure relates generally to valves and, more particularly, to gate valves used in, for example, oil and gas operations.

BACKGROUND

A gate valve generally includes a gate constrained in a valve cavity of a valve body at a first side surface by a first valve seat, and, at a second side surface, by a second valve seat. In many cases, the valve cavity around the gate is filled with a lubricant such as grease (or another type of lubricant). However, over-filling of the grease in the valve cavity may increase the closing torque of the gate valve and/or may create a safety hazard that can result in failure of the valve body and/or other component(s) of the gate valve. Therefore, what is needed is an apparatus, system, or method that addresses one or more of the foregoing issues and/or one or more other issues.

BRIEF DESCRIPTION OF THE DRAWINGS

FIG. 11A is a cross-sectional view of the portion of the gate of the gate valve of FIGS. 9A and 9B, according to one or more other embodiments of the present disclosure.

FIG. 11B is a cross-sectional view of the portion of the gate of FIG. 11A taken along the line 11B-11B of FIG. 11A, according to the one or more other embodiments of the present disclosure.

FIG. 13A is a cross-sectional view of a portion of a gate of the gate valve of FIGS. 1A and 1B, according to one or more embodiments of the present disclosure.

FIG. 13B is a cross-sectional view of the portion of the gate of FIG. 13A taken along the line 13B-13B of FIG. 13A, according to one or more embodiments of the present disclosure.

DETAILED DESCRIPTION

Figure 1A:
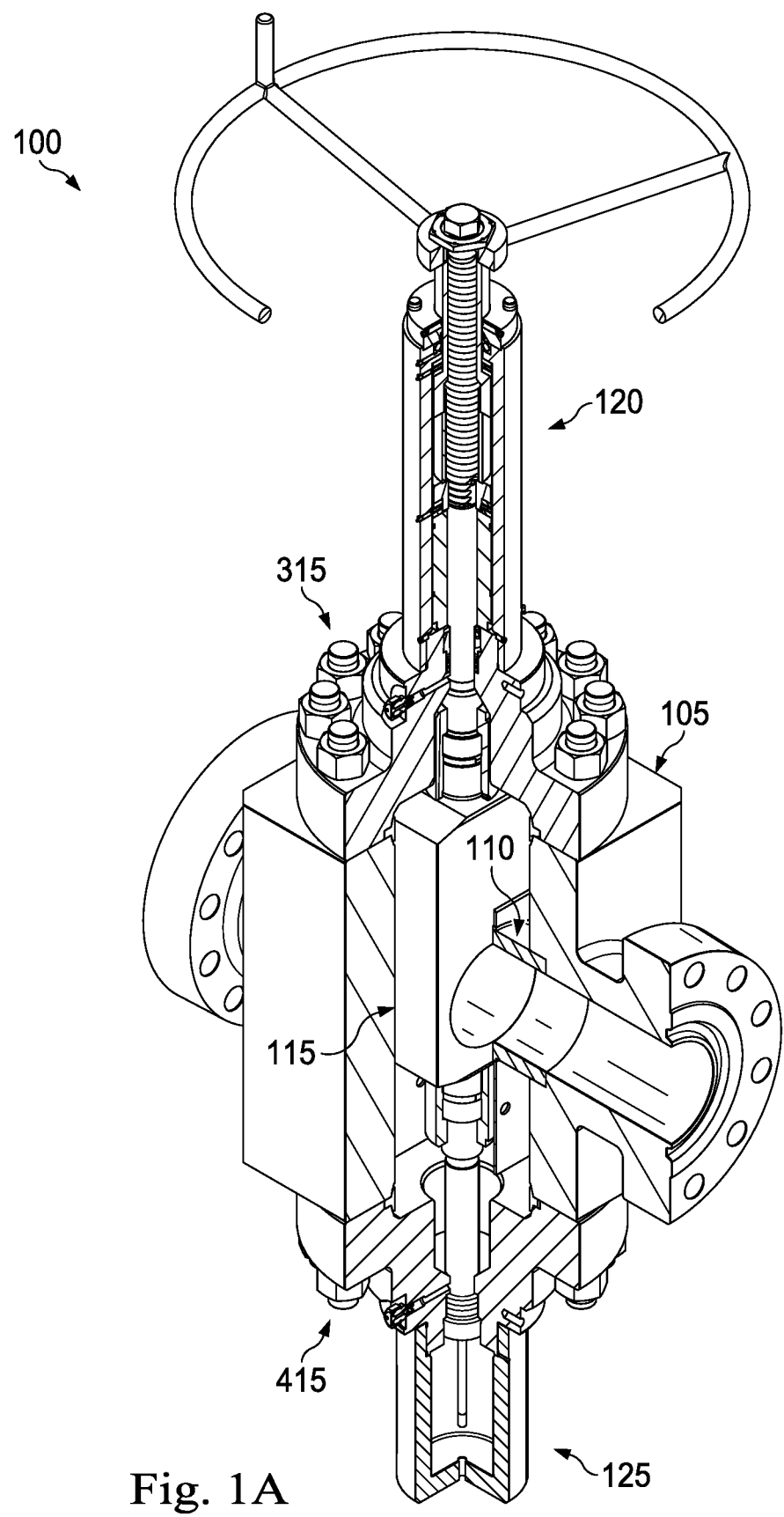
FIG. 1A is a sectional perspective view of a gate valve, according to one or more embodiments of the present disclosure.
Figure 1B:
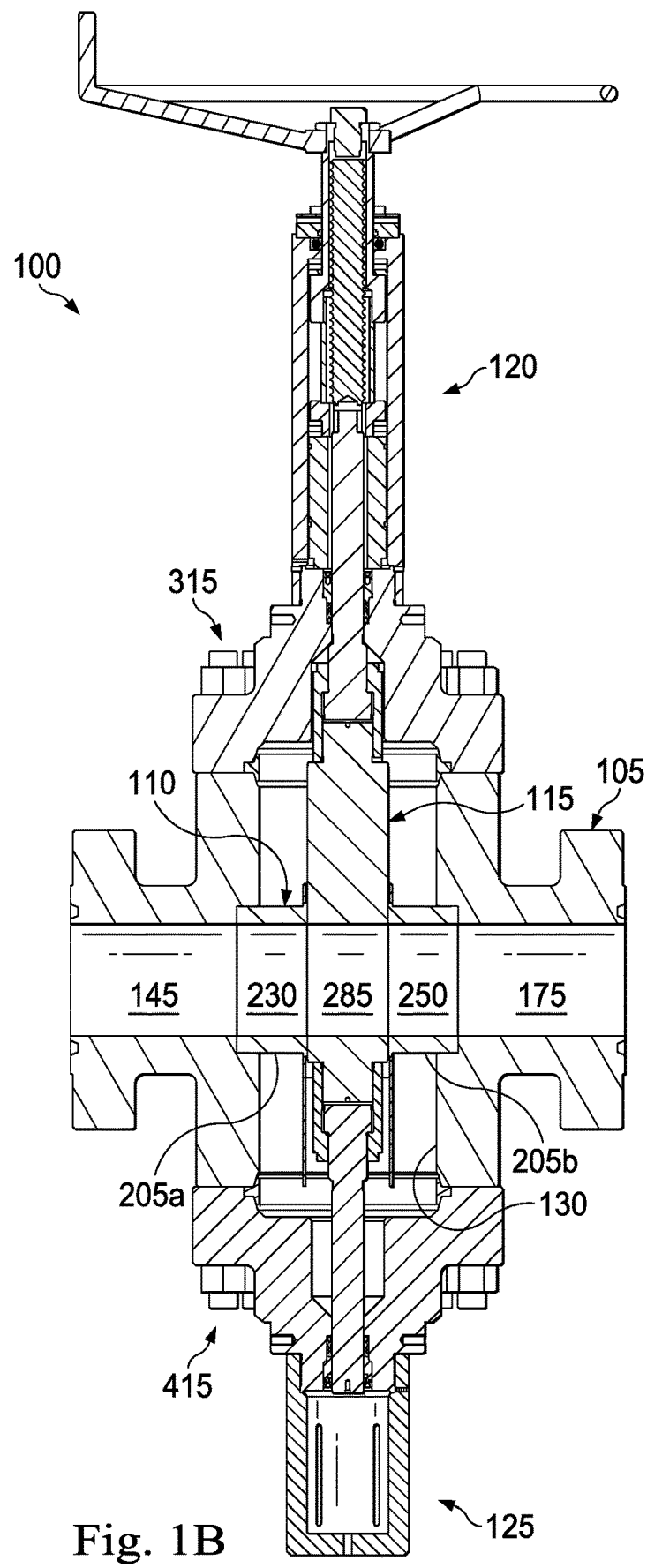
FIG. 1B is a cross-sectional view of the gate valve of FIG. 1A, according to one or more embodiments of the present disclosure.

Referring to FIGS. 1A and 1B, in an embodiment, a gate valve is generally referred to by the reference numeral 100 and includes a valve body 105, a seat assembly 110, a gate assembly 115, an operating end 120, and a balancing end 125. The seat assembly 110 is engaged with the valve body 105. The gate assembly 115 extends within the valve body 105 and is accommodated by the seat assembly 110. The gate assembly 115 is enclosed within the valve body 105, the operating end 120, and the balancing end 125. The operating end 120 is connected to the valve body 105. The operating end 120 is adapted to actuate the gate assembly 115 between a fully-open configuration, in which a fluid is permitted to flow (i.e., be communicated) through the valve body 105, and a fully-closed configuration, in which the fluid is restricted from flowing through the valve body 105. The balancing end 125 is connected to the valve body 105, opposite the operating end 120. The balancing end 125 receives part of the gate assembly 115 and balances axial forces such as, for example, hydraulic lift forces, which are exerted on the gate assembly 115 during operation of the gate valve 100. The seat assembly 110 includes two sets of identical components positioned on either side of the gate assembly 115 to maintain the axial alignment of the gate assembly 115 during actuation between the fully-open configuration and the fully-closed configuration.

Figure 2:
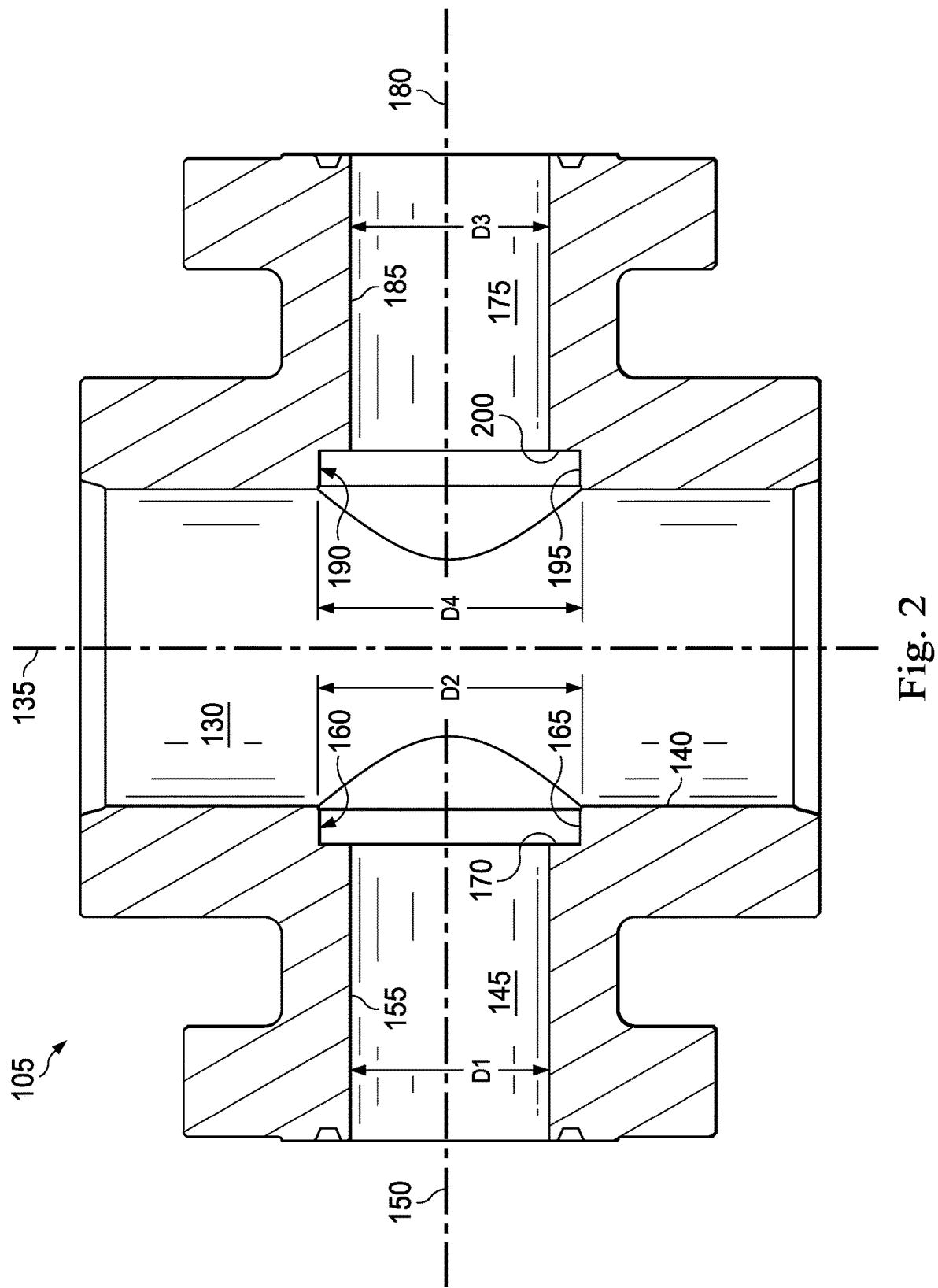
FIG. 2 is a cross-sectional view of a valve body of the gate valve of FIGS. 1A and 1B, according to one or more embodiments of the present disclosure.

Referring to FIG. 2, with continuing reference to FIGS. 1A and 1B, in an embodiment, valve body 105 includes a valve cavity 130, such as, for example, a passage or bore, extending therethrough along a longitudinal axis 135 and defining an interior surface 140 in the valve body 105. A fluid bore 145 extends through the valve body 105 along a longitudinal axis 150 and intersects the valve cavity 130. The fluid bore 145 has an inside diameter D1 and defines an interior surface 155 in the valve body 105. As shown in FIG. 2, the inside diameter D1 is unimpeded along the interior surface 155. In some embodiments, the longitudinal axis 150 of the fluid bore 145 is perpendicular to the longitudinal axis 135 of the valve cavity 130. An annular recess 160 is formed in the interior surface 155. The annular recess 160 adjoins the valve cavity 130 and defines an interior surface 165 and an annular shoulder 170 in the valve body 105. The interior surface 165 adjoins both the annular shoulder 170 and the interior surface 140 of the valve body 105. The annular shoulder 170 adjoins the interior surface 155 of the valve body 105. The annular recess 160 has an inside diameter D2 that is greater than the inside diameter D1 of the fluid bore 145. In addition, a fluid bore 175 extends through the valve body 105 along a longitudinal axis 180 and intersects the valve cavity 130. The fluid bore 175 has an inside diameter D3 and defines an interior surface 185 in the valve body 105. As shown in FIG. 2, the inside diameter D3 is unimpeded along the interior surface 185. In some embodiments, the longitudinal axis 180 of the fluid bore 175 is perpendicular to the longitudinal axis 135 of the valve cavity 130. An annular recess 190 is formed in the interior surface 185. The annular recess 190 adjoins the valve cavity 130 and defines an interior surface 195 and an annular shoulder 200 in the valve body 105. The interior surface 195 adjoins both the annular shoulder 200 and the interior surface 140 of the valve body 105. The annular shoulder 200 adjoins the interior surface 185 of the valve body 105. The annular recess 190 has an inside diameter D4 that is greater than the inside diameter D3 of the fluid bore 175.

Figure 3:
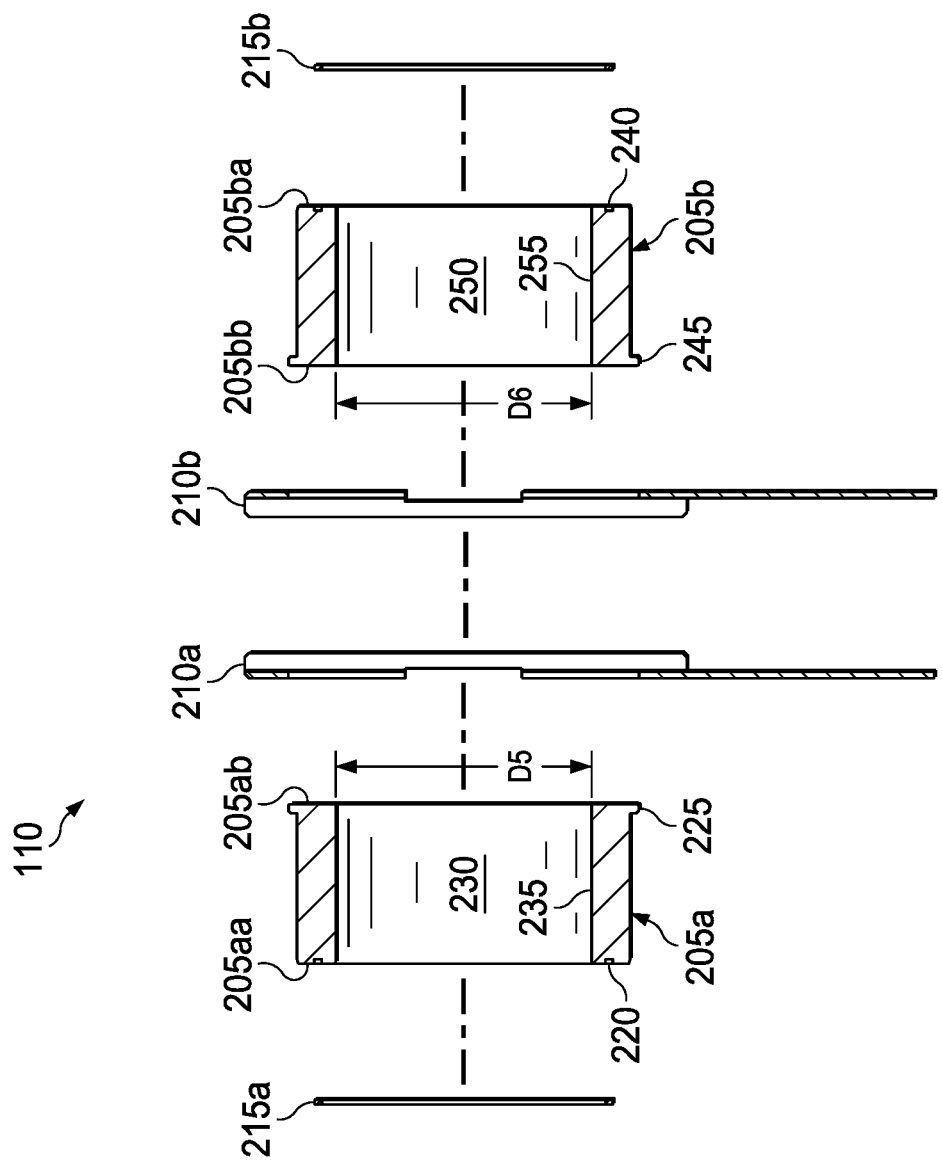
FIG. 3 is a cross-sectional exploded view of a seat assembly of the gate valve of FIGS. 1A and 1B, according to one or more embodiments of the present disclosure.

Referring to FIG. 3, with continuing reference to FIGS. 1A and 1B, in an embodiment, the seat assembly 110 includes valve seats 205a and 205b, gate guides 210a and 210b, and annular seals 215a and 215b. The valve seat 205a is a generally cylindrical member defining a pair of opposing faces 205aa and 205ab. Similarly, the valve seat 205b is a generally cylindrical member defining a pair of opposing faces 205ba and 205bb. In some embodiments, the valve seats 205a and 205b are identical to one another. The valve seat 205a includes an annular groove 220 formed in the face 205aa. The annular groove 220 is adapted to accommodate the annular seal 215a. An annular ridge 225 extends radially outward from the exterior of the valve seat 205a proximate the face 205ab. In some embodiments, the face 205ab is at least partially defined by the annular ridge 225. A fluid bore 230 having an inside diameter D5 extends longitudinally through the valve seat 205a, including the opposing faces 205aa and 205ab. The fluid bore 230 defines an interior surface 235 in the valve seat 205a. As shown in FIG. 3, the inside diameter D5 is unimpeded along the interior surface 235. The face 205aa of the valve seat 205a is adapted to engage the annular shoulder 170 in the valve body 105 when the valve seat 205a is installed in the valve body 105. In addition, the valve seat 205b includes an annular groove 240 formed in the face 205ba. The annular groove 240 is adapted to accommodate an annular seal 215b. Further, an annular ridge 245 extends radially outward from the exterior of the valve seat 205b proximate the face 205bb. In some embodiments, the face 205bb is at least partially defined by the annular ridge 245. A fluid bore 250 having an inside diameter D6 extends longitudinally through the valve seat 205b, including the opposing faces 205ba and 205bb. The fluid bore 250 defines an interior surface 255 in the valve seat 205b. As shown in FIG. 3, the inside diameter D6 is unimpeded along the interior surface 255. The face 205ba of the valve seat 205b is adapted to engage the annular shoulder 200 in the valve body 105 when the valve seat 205b is installed in the valve body 105. In some embodiments, the inside diameters D5 and D6 are equal. In some embodiments, the inside diameters D1 and D3 are equal to the inside diameters D5 and D6, respectively.

The gate guide 210a is adapted to circumscribe the exterior of the valve seat 205a and to be supported, for example, in a parallel relation to the gate guide 210b. In some embodiments, the gate guide 210a is adapted to circumscribe the annular ridge 225 of the valve seat 205a. In some embodiments, when the gate guide 210a circumscribes the valve seat 205a, at least a portion of the gate guide 210a is co-planar with the face 205ab of the valve seat 205a. In addition, the gate guide 210b is adapted to circumscribe the exterior of the valve seat 205b and to be supported, for example, in a parallel relation to the gate guide 210a. In some embodiments, the gate guide 210b is adapted to circumscribe the annular ridge 245 of the valve seat 205b. In some embodiments, when the gate guide 210b circumscribes the valve seat 205b, at least a portion of the gate guide 210b is co-planar with the face 205bb of the valve seat 205a. In some embodiments, the gate guides 210a and 210b are identical to one another. In some embodiments, the gate guides 210a and 210b are connected to one another.

Figure 4:
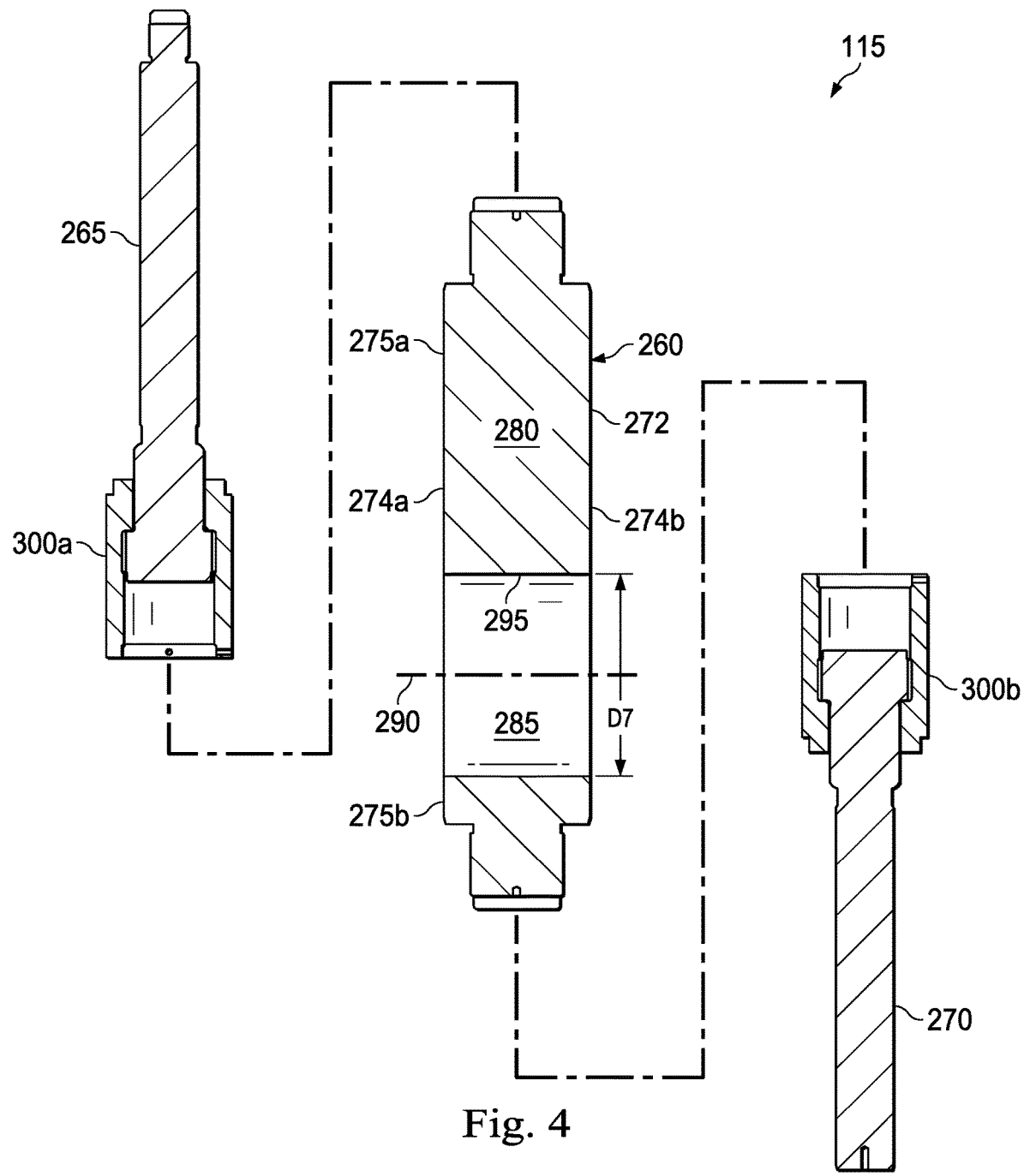
FIG. 4 is a cross-sectional exploded view of a gate assembly of the gate valve of FIGS. 1A and 1B, according to one or more embodiments of the present disclosure.

Referring to FIG. 4, with continuing reference to FIGS. 1A and 1B, in an embodiment, the gate assembly 115 includes a gate 260, an operating stem 265, and a balance stem 270. The gate 260 defines a gate body 272. The gate body 272 defines opposing side surfaces 274a and 274b. The operating stem 265 is connectable to an end portion 275a of the gate body 272 of the gate 260. The balance stem 270 is connectable to an end portion 275b of the gate body 272 of the gate 260, opposite the operating stem 265. A block 280 is defined proximate the end portion 275a of the gate 260. In some embodiments, the block 280 forms a solid mass that is free of any holes, gaps, cavities, openings, apertures, voids, or the like. In contrast, a fluid bore 285 extends through the gate body 272 of the gate 260, including the opposing side surfaces 274a and 274b, along a center axis 290 proximate the end portion 275b. The fluid bore 285 has an inside diameter D7 and defines an interior surface 295 in the gate 260. As shown in FIG. 4, the inside diameter D7 is unimpeded along the interior surface 295. Alternatively, the fluid bore 285 may be located proximate the end portion 275a of the gate 260 and the block 280 may be located proximate the end portion 275b of the gate 260. The operating stem 265 and the balance stem 270 are connectable to the gate 260 via gate nuts 300a and 300b, respectively. In some embodiments, when the operating stem 265 and the balance stem 270 are connected to the gate 260, the operating stem 265 and the balance stem 270 are co-axial. Moreover, in some embodiments, the operating stem 265 and the balance stem 270 are co-axial with the longitudinal axis 135 of the valve body 105 when the gate assembly 115 is installed in the valve body 105.

Figure 5:
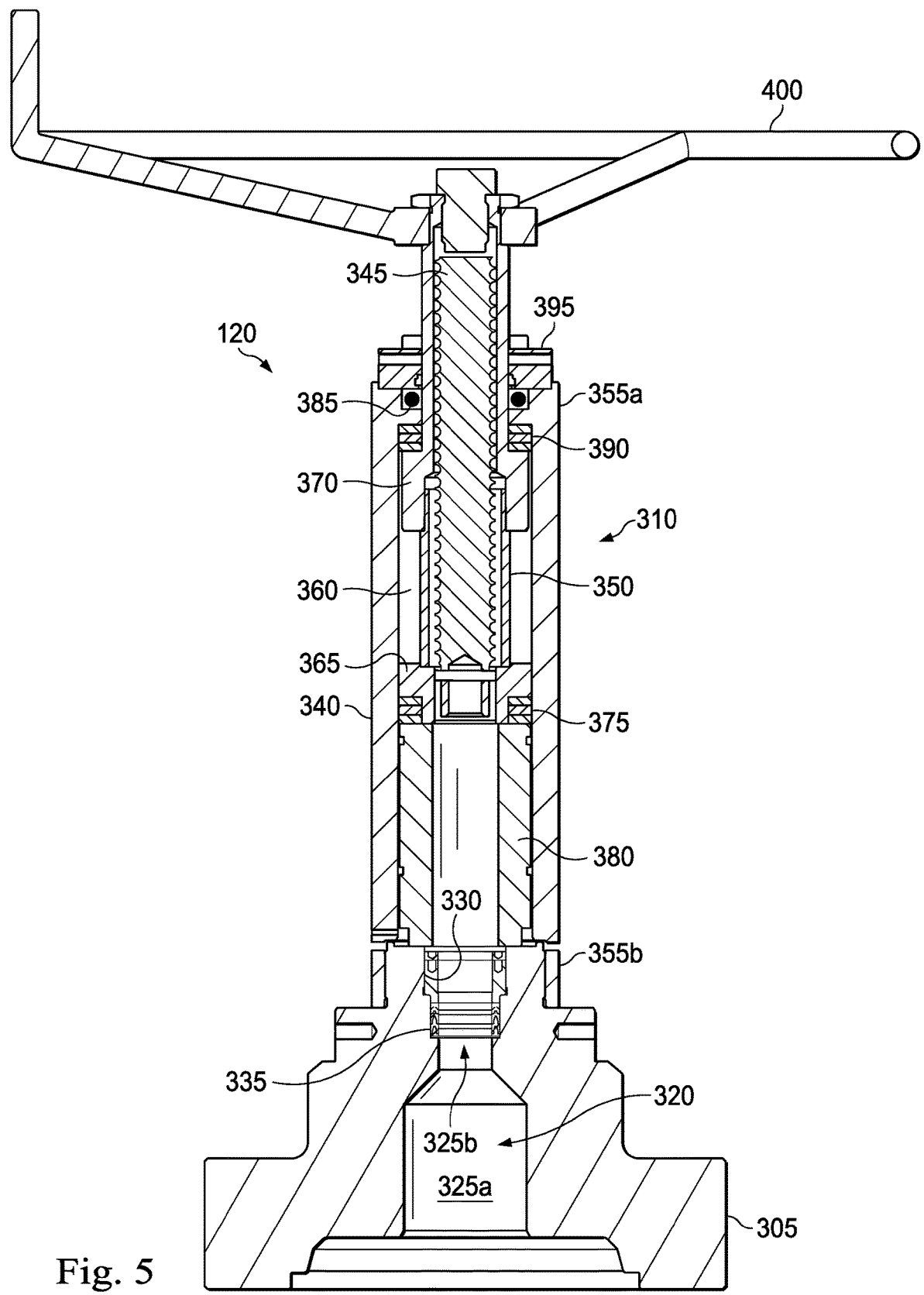
FIG. 5 is a cross-sectional view of an operating end of the gate valve of FIGS. 1A and 1B, according to one or more embodiments of the present disclosure.

Referring to FIG. 5, with continuing reference to FIGS. 1A and 1B, in an embodiment, the operating end 120 includes a bonnet 305 and a linear actuator such as, for example, a ball-screw assembly 310 connected to the bonnet 305. The bonnet 305 is connectable to the valve body 105 via, for example, a plurality of fasteners 315 (shown in FIGS. 1A and 1B). An internal passage 320 extends longitudinally through the bonnet 305. The internal passage 320 defines an enlarged inside diameter portion 325a and a reduced inside diameter portion 325b. In some embodiments, the internal passage 320 of the bonnet 305 is co-axial with the longitudinal axis 135 of the valve body 105 when the bonnet 305 is connected to the valve body 105. The enlarged inside diameter portion 325a of the internal passage 320 is adapted to accommodate the gate nut 300a of the operating stem 265. A seal gland 330 is defined in the reduced inside diameter portion 325b of the internal passage 320. The seal gland 330 accommodates a packing element 335, which packing element, in turn, is adapted to provide both a static and a dynamic seal between the bonnet 305 and the operating stem 265 of the gate assembly 115. A balancing port (not shown) may be formed through the bonnet 305 into the internal passage 320. During operation, the balancing port may be placed in communication with the fluid exiting the fluid bore 175 of the gate valve 100, as will be described in further detail below. Such fluid communication facilitates balancing of axial forces such as, for example, hydraulic lift forces, which are exerted on the gate assembly 115.

The ball-screw assembly 310 includes a ball-screw housing 340, a ball-screw 345 extending within the ball-screw housing 340, and a ball-screw nut 350 that threadably engages the ball-screw 345. The ball-screw housing 340 defines opposing end portions 355a and 355b. The end portion 355b of the ball-screw housing 340 is connected to the bonnet 305. An internal passage 360 extends longitudinally through the ball-screw housing 340. In some embodiments, when the operating end 120 is connected to the valve body 105, the internal passage 360 is co-axial with the longitudinal axis 135 of the valve body 105. The ball-screw nut 350 is held at opposite ends by an upper bearing spacer 365 and an adapter stem 370. The upper bearing spacer 365 is supported within the ball-screw housing 340 by a lower thrust bearing 375 and a lower bearing spacer 380, which together permit the upper bearing spacer 365 to rotate within the ball-screw housing 340. Similarly, the adapter stem 370 is supported within the ball-screw housing 340 by a radial bearing 385 and an outer thrust bearing 390, which together permit the adapter stem 370 to rotate within the ball-screw housing 340. Accordingly, the adapter stem 370, the ball-screw nut 350, and the upper bearing spacer 365 are together capable of rotating within the ball-screw housing 340 and relative to the ball-screw 345. A cover plate 395 is connected at the end portion 355a of the ball-screw housing 340 to accommodate a portion of the adapter stem 370. A handle 400 is connected to a portion of the adapter stem 370 extending outside the ball-screw housing 340. The handle 400 is adapted to rotate the adapter stem 370, the ball-screw nut 350, and the upper bearing spacer 365 in relation to the ball-screw 345, thus displacing the ball-screw 345 axially in relation to the ball-screw nut 350. Moreover, when the bonnet 305 is connected to the valve body 105, the ball-screw 345 is connectable to the operating stem 265 of the gate assembly 115 so that any axial displacement of the ball-screw 345 is transmitted to the operating stem 265. As a result, rotation of the handle 400 actuates the gate assembly 115 axially between the fully-open configuration and the fully-closed configuration.

Figure 6:
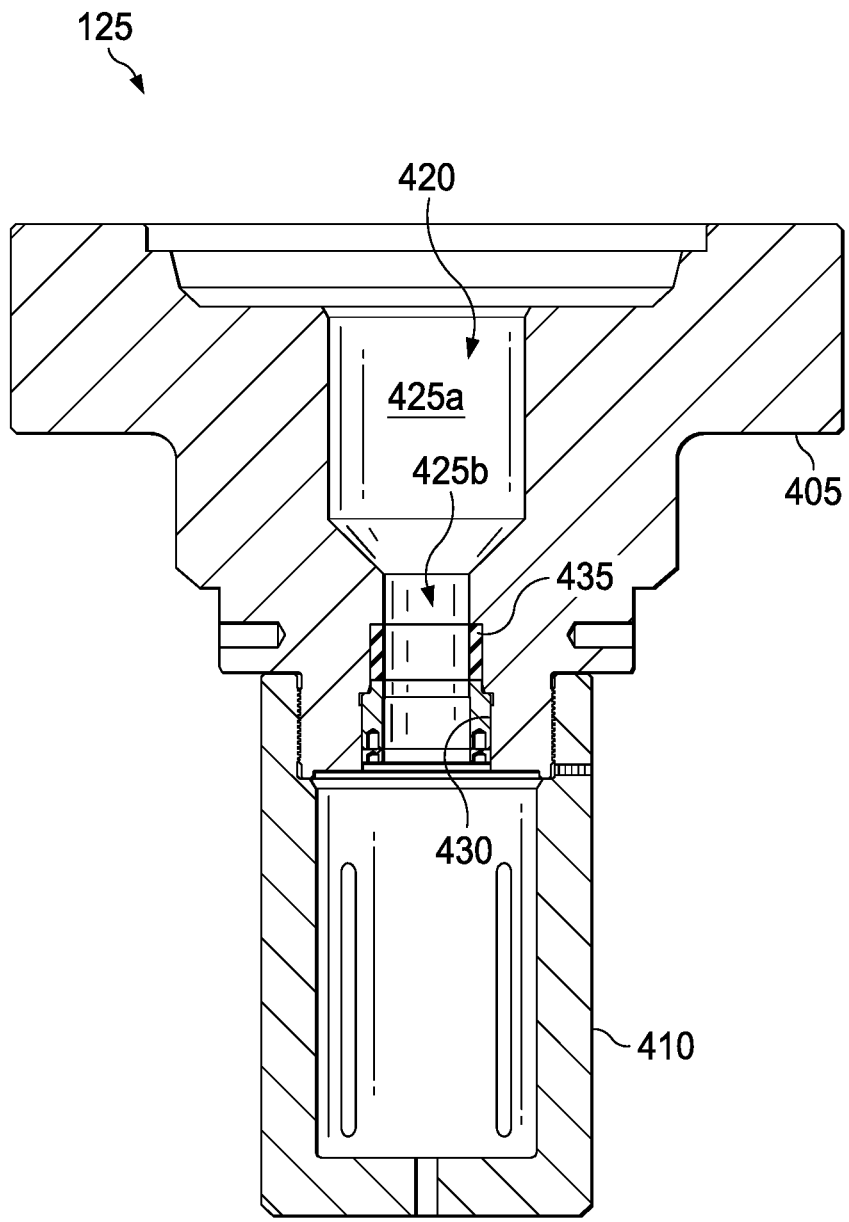
FIG. 6 is a cross-sectional view of a balancing end of the gate valve of FIGS. 1A and 1B, according to one or more embodiments of the present disclosure.

Referring to FIG. 6, with continuing reference to FIGS. 1A and 1B, in an embodiment, the balancing end 125 includes a bonnet 405 and a stem protector 410. The stem protector 410 is connected to the bonnet 405. The bonnet 405 is connectable to the valve body 105, opposite the bonnet 305 of the operating end 120, via, for example, a plurality of fasteners 415 (shown in FIGS. 1A and 1B). An internal passage 420 extends longitudinally through the bonnet 405. The internal passage 420 defines an enlarged inside diameter portion 425a and a reduced inside diameter portion 425b. In some embodiments, the internal passage 420 of the bonnet 405 is co-axial with the longitudinal axis 135 of the valve body 105 when the bonnet 405 is connected to the valve body 105. The enlarged inside diameter portion 425a of the internal passage 420 is adapted to accommodate the gate nut 300b of the balance stem 270. A seal gland 430 is defined in the reduced inside diameter portion 425b of the internal passage 420. The seal gland 430 accommodates a packing element 435, which packing element, in turn, is adapted to provide both a static and a dynamic seal between the bonnet 405 and the balance stem 270 of the gate assembly 115. A balancing port (not shown) may be formed through the bonnet 405 into the internal passage 420. During operation, as will be described in further detail below, the balancing port may be placed in communication with the fluid exiting the fluid bore 175 of the gate valve 100. Such fluid communication facilitates balancing of axial forces such as, for example, hydraulic lift, exerted on the gate assembly 115.

In operation, the gate 260 is constrained at the side surface 274a by the valve seat 205a (shown in FIGS. 1B and 3) and, at the side surface 274b, by the valve seat 205b (shown in FIGS. 1A, 1B, and 3). The valve cavity 130 (shown in FIGS. 1A, 1B, and 2) around the gate 260 is pressurized with grease (or another type of lubricant). Moreover, the fluid bore(s) 145, 175, 230, 250, and/or 285 (shown most clearly in FIG. 1B) of the gate valve 100 is/are pressurized with process fluid. During operation, the pressurized grease in the valve cavity 130 migrates between the gate 260 and the respective valve seats 205a and 205b (i.e., across the respective faces 205ab and 205bb) and into the process fluid flowing within the fluid bore(s) 145, 175, 230, 250, and/or 285. In several embodiments, the pressurized grease provides a barrier against solid particles (e.g., sand, fines, debris, etc.) within the process fluid, with the barrier preventing, or at least resisting, the solid particles from getting behind, or otherwise bypassing, the gate 260 and entering, for example, the valve cavity 130. The migration of the grease across the respective faces 205ab and 205bb facilitates: sealing engagement between the valve seats 205a and 205b and the gate 260; translational movement of the gate 260 between the fully-open configuration and the fully-closed configuration; resistance to solid particles (e.g., sand, fines, debris, etc.) within the process fluid from getting behind, or otherwise bypassing, the gate 260 and entering into, for example, the valve cavity 130; or any combination of the foregoing. To promote such migration, the grease in the valve cavity 130 may be pressurized to a greater degree than the process fluid flowing within the fluid bore(s) 145, 175, 230, 250, and/or 285. In the fully-open configuration, the interior surface 295 defined in the gate 260 by the fluid bore 285 is aligned with the interior surface 235 defined in the seat 205a by the fluid bore 230 and the interior surface 255 defined in the seat 205b by the fluid bore 250. As a result, unimpeded fluid flow is permitted through the gate valve 100 via the fluid bores 145, 175, 230, 250, and 285. In the fully-closed configuration, the block 280 of the gate 260 is aligned with the interior surface 235 defined in the seat 205a by the fluid bore 230 and the interior surface 255 defined in the seat 205b by the fluid bore 250. As a result, the block 280 prevents fluid flow through the gate valve 100 by offsetting the fluid bore 285 from the fluid bores 145, 175, 230, and 250. In one or more embodiments, the valve cavity 130 is pressurized with a lubricant, such as grease and/or another type of lubricant, using a fluid transport device, which is operably associated with a grease container; in one embodiment, the fluid transport device is a pump or a compressor; in another embodiment, in addition, or instead of a pump or compressor, the fluid transport device is, or includes, a hydraulic power unit accumulator; in several embodiments, the fluid transport device provides pressurized grease to the valve cavity 130; in several embodiments, the fluid transport device provides pressurized grease to the valve cavity 130 via one or more fluid lines, one or more valves, one or more metering devices, or any combination thereof.

Figure 7A:
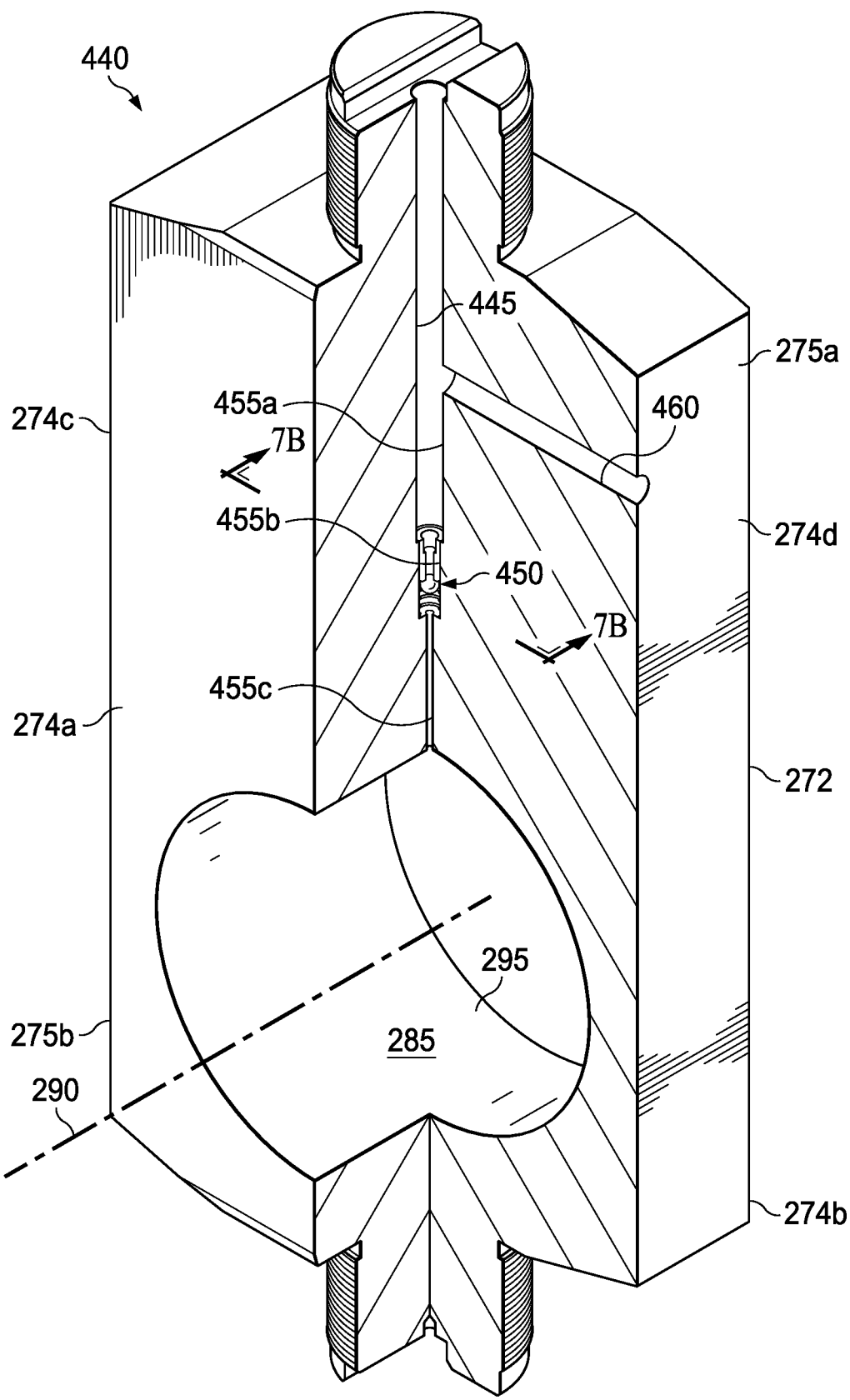
FIG. 7A is a sectional perspective view of a gate of the gate valve of FIGS. 1A and 1B, according to one or more embodiments of the present disclosure.

Referring to FIG. 7A, with continuing reference to FIGS. 1-6, in one or more embodiments, the gate 260 is omitted from the gate valve 100 and replaced with a gate 440. The gate 440 includes several features that are substantially identical to corresponding features of the gate 260, which substantially identical features are given the same reference numerals. The opposing side surfaces 274a and 274b of the gate body 272 of the gate 440 are spaced in a parallel relation. In addition to the opposing side surfaces 274a and 274b, the gate body 272 of the gate 440 defines opposing side surfaces 274c and 274d. The opposing side surfaces 274c and 274d extend between the opposing side surfaces 274a and 274b. The opposing side surfaces 274c and 274d are spaced in a parallel relation. Moreover, the opposing side surfaces 274c and 274d are spaced in a perpendicular relation with the opposing side surfaces 274a and 274b. The gate 440 includes a passage (or passage segment) 445 extending through the end portion 275a of the gate body 272 and into the fluid bore 285. The passage 445 may be capped (not shown; e.g., by a threaded cap) opposite the fluid bore 285. The passage 445 extends perpendicular to the fluid bore 285. A flow valve 450 is positioned within the passage 445. In several embodiments, the flow valve 450 is a check valve or a one-way valve. For example, the flow valve 450 may be or include a diaphragm check valve, a swing check valve, a lift-check valve, a ball check valve, or any combination thereof.

The passage 445 includes an enlarged-diameter portion 455a proximate the end portion 275a of the gate body 272, a reduced-diameter portion 275b proximate the fluid bore 285, and an intermediate-diameter portion 275c between the enlarged-diameter portion 275a and the reduced-diameter portion 275b. The flow valve 450 extends within the intermediate-diameter portion 275c of the passage 445. The gate 440 also includes a passage (or passage segment) 460 extending through the side surface 274d, through the gate body 272, and into the enlarged-diameter portion 455a of the passage 445. The passage 460 extends angularly from the passage 445. As shown in FIG. 7A, in one embodiment, the passage 460 extends angularly from the passage 445 at an angle of 90 degrees, perpendicular to the passage 445. As shown in FIG. 7A, in one embodiment, the passage 460 extends perpendicular to both the passage 445 and the fluid bore 285. In other embodiments, unlike that which is shown in FIG. 7A, the passage 460 extends angularly from the passage 445 at an angle other than 90 degrees, and thus is not perpendicular to the passage 445.

Figure 7B:
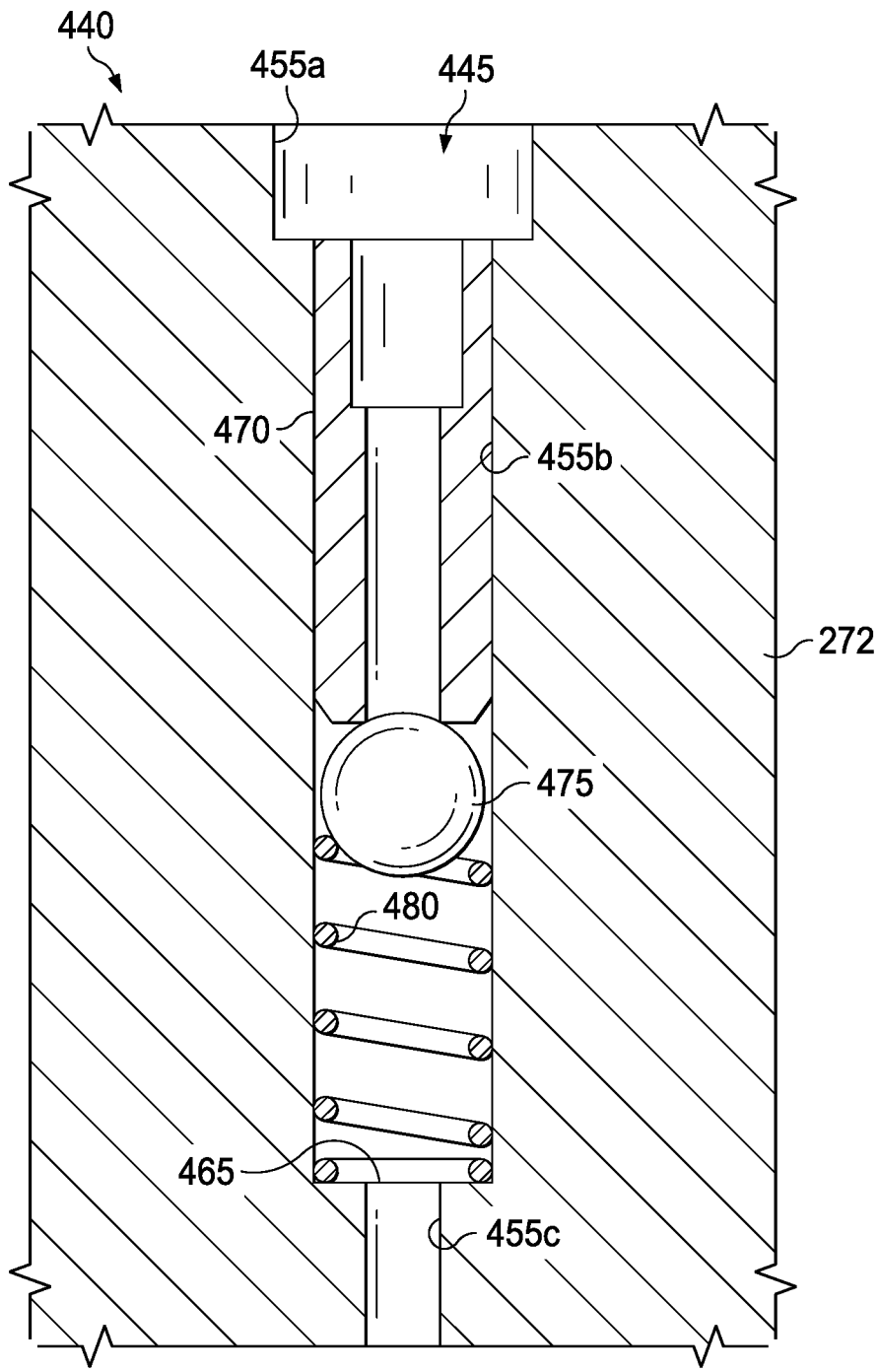
FIG. 7B is an enlarged cross-sectional view of the gate of FIG. 7A taken along the line 7B-7B in FIG. 7A, according to one or more embodiments of the present disclosure.

Turning also to FIG. 7B, in one or more embodiments, the gate 440 includes an internal shoulder 465 between the reduced-diameter portion 275b and the intermediate-diameter portion 275c of the passage 445. In one or more embodiments, the flow valve 450 includes a valve seat 470, a valve member 475, and a biasing member 480 positioned against the internal shoulder 465. The valve seat 470 extends within the intermediate-diameter portion 275c of the passage 445. For example, the valve seat 470 may be secured within the intermediate-diameter portion 275c of the passage 445 via press-fitting, shrink-fitting, interference-fitting, adhesive, locking ring(s), set screw(s), the like, or any combination thereof. The valve member 475 extends between the biasing member 480 and the valve seat 470 and, as a result, is urged toward the valve seat 470 by the biasing member 480.

The flow valve 450 permits fluid flow (or fluid communication) from the enlarged-diameter portion 455a to the reduced-diameter portion 275b of the passage 445 (toward the fluid bore 285) while, at the same time, preventing, or at least reducing, fluid flow (or fluid communication) from the reduced-diameter portion 275b to the enlarged-diameter portion 455a (away from the fluid bore 285). More particularly, when fluid pressure in the enlarged-diameter portion 455a exceeds fluid pressure in the reduced-diameter portion 275b by a threshold amount, the valve member 475 un-seats from the valve seat 470 and permits fluid flow (or fluid communication) from the enlarged-diameter portion 455a to the reduced-diameter portion 275b. The threshold amount depends on the force applied to the valve member 475 by the biasing member 480 and may be adjusted by selecting the biasing member 480 to suit a particular service application for the gate valve 100. In contrast, when the pressure in the enlarged-diameter portion 455a does not exceed the pressure in the reduced-diameter portion 275b at all, or exceeds the pressure in the reduced-diameter portion 275b by less than the threshold amount, the biasing member 480 urges the valve member 475 to seat against the valve seat 470. As a result, fluid flow (or fluid communication) is prevented, or at least reduced, from the reduced-diameter portion 275b to the enlarged-diameter portion 455a of the passage 445, and vice-versa. Although described herein as including the valve seat 470, the valve member 475, and the biasing member 480, the flow valve 450 may instead be or include another type of check valve or one-way valve.

In operation, the gate 440 is constrained at the side surface 274a by the valve seat 205a (shown in FIGS. 1B and 3) and, at the side surface 274b, by the valve seat 205b (shown in FIGS. 1A, 1B, and 3). The valve cavity 130 (shown in FIGS. 1A, 1B, and 2) around the gate 440 is pressurized with grease (or another type of lubricant). Moreover, the fluid bore(s) 145, 175, 230, 250, and/or 285 (shown most clearly in FIG. 1B) of the gate valve 100 is/are pressurized with process fluid. During operation, the pressurized grease in the valve cavity 130 migrates between the gate 440 and the respective valve seats 205a and 205b (i.e., across the respective faces 205ab and 205bb) and into the process fluid flowing within the fluid bore(s) 145, 175, 230, 250, and/or 285. In several embodiments, the pressurized grease provides a barrier against solid particles (e.g., sand, fines, debris, etc.) within the process fluid, with the barrier preventing, or at least resisting, the solid particles from getting behind, or otherwise bypassing, the gate 440 and entering, for example, the valve cavity 130. The migration of the grease across the respective faces 205ab and 205bb facilitates: sealing engagement between the valve seats 205a and 205b and the gate 440; translational movement of the gate 440 between the fully-open configuration and the fully-closed configuration; resistance to solid particles (e.g., sand, fines, debris, etc.) within the process fluid from getting behind, or otherwise bypassing, the gate 440 and entering into, for example, the valve cavity 130; or any combination of the foregoing. To promote such migration, the grease in the valve cavity 130 may be pressurized to a greater degree than the process fluid flowing within the fluid bore(s) 145, 175, 230, 250, and/or 285.

During operation, the passages 445 and 460 are configured to prevent, or at least reduce, over-pressurization of the grease in the valve cavity 130. More particularly, when the fluid pressure in the valve cavity 130 exceeds the fluid pressure in the fluid bore 285 of the gate 440 by a threshold amount, the flow valve 450 provides pressure balancing, permitting the grease to flow (i.e., be communicated) into the passage 460 at the side surface 274d, through the passage 460, into the passage 445, through the flow valve 450, through the passage 445, and into the fluid bore 285 of the gate 440. Accordingly, in some embodiments, the flow valve 450 ensures that the gate valve 100, which includes the gate 440 and the flow valve 450, is pressure balanced by preventing a pressure differential across the flow valve 450 from exceeding a predetermined pressure differential, that is, by preventing a pressure differential between the valve cavity 130 and the fluid bore 285 of the gate 440 from exceeding the predetermined pressure differential; in several embodiments, the predetermined pressure differential is the threshold amount by which the fluid pressure in the valve cavity 130 exceeds the fluid pressure in the fluid bore 285 of the gate 440, thereby opening the flow valve 450 to permit the grease to flow (i.e., be communicated) towards the fluid bore 285; in other words, when the pressure differential across the flow valve 450 reaches the predetermined pressure differential, the flow valve 450 opens to permit the grease to flow (i.e., be communicated) towards the fluid bore 285 of the gate 440. Subsequently, so long as the fluid bore 285 of the gate 440 is at least partially aligned with the fluid bores 145, 175, 230, and 250 (i.e., the gate valve 100 is not in the fully-closed configuration), the process fluid carries away the excess grease to reduce the fluid pressure of the grease remaining in the valve cavity 130.

Alternatively, in some embodiments, the flow valve 450 may be omitted so that the fluid pressure in the valve cavity 130 need not exceed the fluid pressure in the fluid bore 285 of the gate 440 by the threshold amount in order for the grease to flow (i.e., be communicated) into the passage 460 at the side surface 274d, through the passage 460, into the passage 445, through the passage 445, and into the fluid bore 285 of the gate 440. Accordingly, in such embodiments, the gate 440 from which the flow valve 450 is omitted ensures that the gate valve 100 (which includes the gate 440 but not the flow valve 450) is pressure balanced by equalizing the pressure between the valve cavity 130 and the fluid bore 285 of the gate 440.

In several embodiments, with or without the flow valve 450, the gate 440 reduces the closing torque of the gate valve 100, which includes the gate 440, by reducing the fluid pressure of the grease remaining in the valve cavity 130 (i.e., via pressure balancing by either preventing the pressure differential across the flow valve 450 from exceeding a predetermined pressure differential or equalizing the pressure without the flow valve 450). Moreover, any safety hazard associated with over-pressurization of the valve cavity 130 that might otherwise result in failure of the valve body and/or other component(s) of the gate valve 100 is reduced.

In one or more embodiments, the valve cavity 130 is pressurized with a lubricant, such as grease and/or another type of lubricant, using a fluid transport device, which is operably associated with a grease container; in one embodiment, the fluid transport device is a pump or a compressor; in another embodiment, in addition, or instead of a pump or compressor, the fluid transport device is, or includes, a hydraulic power unit accumulator; in several embodiments, the fluid transport device provides pressurized grease to the valve cavity 130; in several embodiments, the fluid transport device provides pressurized grease to the valve cavity 130 via one or more fluid lines, one or more valves, one or more metering devices, or any combination thereof.

Figure 8B:
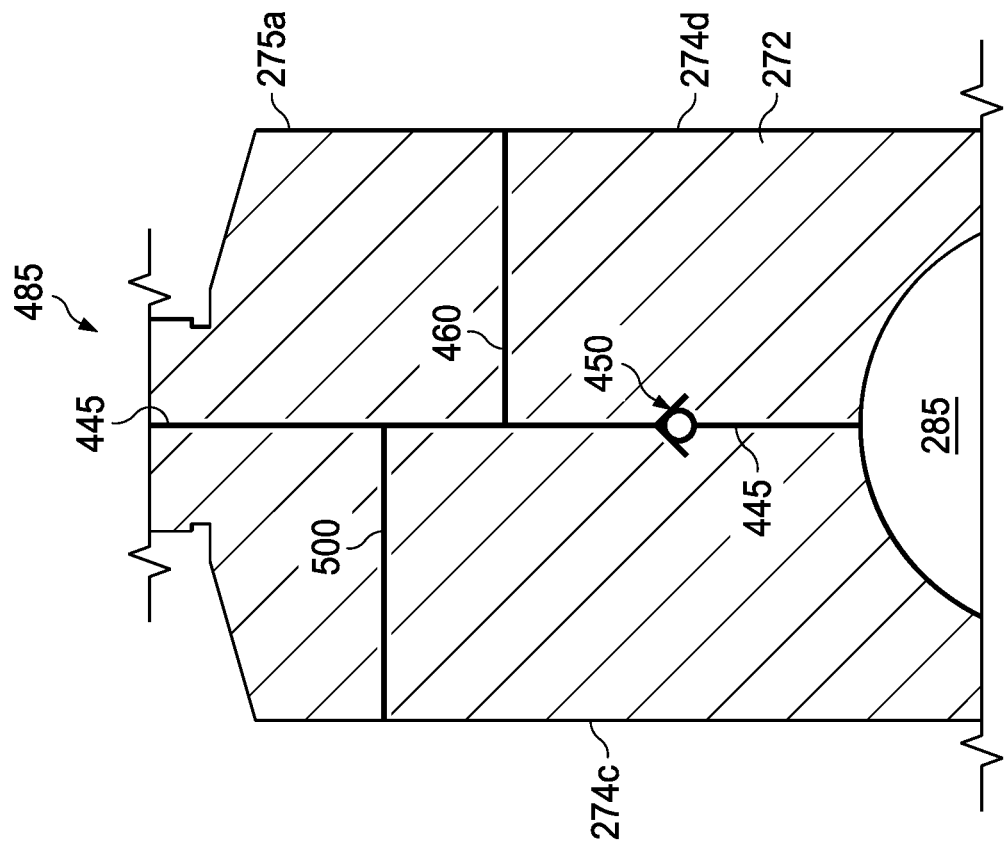
FIG. 8B is a cross-sectional view of the portion of the gate of FIG. 8A taken along the line 8B-8B of FIG. 8A, according to one or more embodiments of the present disclosure.
Figure 8A:
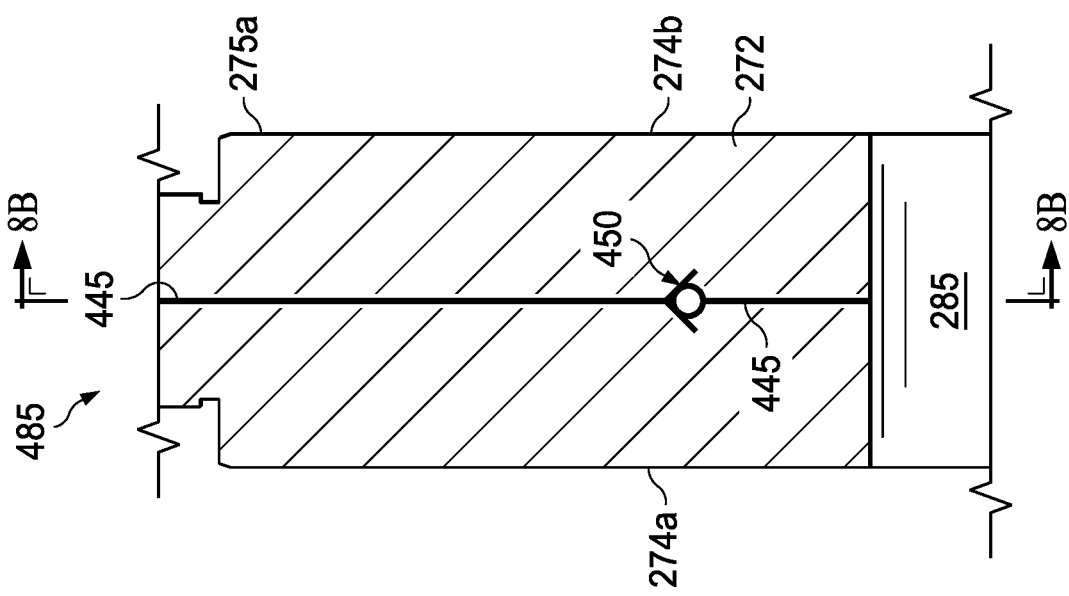
FIG. 8A is a cross-sectional view of a portion of a gate of the gate valve of FIGS. 1A and 1B, according to one or more embodiments of the present disclosure.

Referring to FIGS. 8A and 8B, with continuing reference to FIGS. 1-6, 7A, and 7B, in one or more embodiments, the gate 440 is omitted from the gate valve 100 and replaced with a gate 485. The gate 485 includes several features that are substantially identical to corresponding features of the gate 440, which substantially identical features are given the same reference numerals. As shown in FIG. 8B, a passage (or passage segment) 500 is formed through the side surface 274c of the gate 485, through the gate body 272, and into the passage 445. In addition, or instead, the passage 460 (also shown in FIG. 7A) is formed through the side surface 274d of the gate 485, through the gate body 272, and into the passage 445. The passages 460 and 500 are offset from each other so as to intersect the passage 445 at different locations along the length of the passage 445. The passages 460 and 500 each extend angularly from the passage 445. As shown in FIG. 8B, in one embodiment, the passages 460 and 500 each extend angularly from the passage 445 at an angle of 90 degrees, perpendicular to the passage 445. As shown in FIG. 8B, in one embodiment, the passages 460 and 500 each extend perpendicular to both the passage 445 and the fluid bore 285. In other embodiments, unlike that which is shown in FIG. 8A, the passages 460 and 500 each extend angularly from the passage 445 at an angle other than 90 degrees, and thus are not perpendicular to the passage 445.

In operation, the gate 485 is constrained at the side surface 274a by the valve seat 205a (shown in FIGS. 1B and 3) and, at the side surface 274b, by the valve seat 205b (shown in FIGS. 1A, 1B, and 3). The valve cavity 130 (shown in FIGS. 1A, 1B, and 2) around the gate 485 is pressurized with grease (or another type of lubricant). Moreover, the fluid bore(s) 145, 175, 230, 250, and/or 285 (shown most clearly in FIG. 1B) of the gate valve 100 is/are pressurized with process fluid. During operation, the pressurized grease in the valve cavity 130 migrates between the gate 485 and the respective valve seats 205a and 205b (i.e., across the respective faces 205ab and 205bb) and into the process fluid flowing within the fluid bore(s) 145, 175, 230, 250, and/or 285. In several embodiments, the pressurized grease provides a barrier against solid particles (e.g., sand, fines, debris, etc.) within the process fluid, with the barrier preventing, or at least resisting, the solid particles from getting behind, or otherwise bypassing, the gate 485 and entering, for example, the valve cavity 130. The migration of the grease across the respective faces 205ab and 205bb facilitates: sealing engagement between the valve seats 205a and 205b and the gate 485; translational movement of the gate 485 between the fully-open configuration and the fully-closed configuration; resistance to solid particles (e.g., sand, fines, debris, etc.) within the process fluid from getting behind, or otherwise bypassing, the gate 485 and entering into, for example, the valve cavity 130; or any combination of the foregoing. To promote such migration, the grease in the valve cavity 130 may be pressurized to a greater degree than the process fluid flowing within the fluid bore(s) 145, 175, 230, 250, and/or 285.

During operation, the passages 445, 460, and 500 are configured to prevent, or at least reduce, over-pressurization of the grease in the valve cavity 130. More particularly, when the fluid pressure in the valve cavity 130 exceeds the fluid pressure in the fluid bore 285 of the gate 485 by a threshold amount, the flow valve 450 provides pressure balancing, permitting the grease to flow (i.e., be communicated) into the passage 500 at the side surface 274c, through the passage 500, into the passage 460 at the side surface 274d, through the passage 460, into the passage 445, through the flow valve 450, through the passage 445, and into the fluid bore 285 of the gate 485. Accordingly, in some embodiments, the flow valve 450 ensures that the gate valve 100, which includes the gate 485 and the flow valve 450, is pressure balanced by preventing a pressure differential across the flow valve 450 from exceeding a predetermined pressure differential, that is, by preventing a pressure differential between the valve cavity 130 and the fluid bore 285 of the gate 485 from exceeding the predetermined pressure differential; in several embodiments, the predetermined pressure differential is the threshold amount by which the fluid pressure in the valve cavity 130 exceeds the fluid pressure in the fluid bore 285 of the gate 485, thereby opening the flow valve 450 to permit the grease to flow (i.e., be communicated) towards the fluid bore 285; in other words, when the pressure differential across the flow valve 450 reaches the predetermined pressure differential, the flow valve 450 opens to permit the grease to flow (i.e., be communicated) towards the fluid bore 285 of the gate 485. Subsequently, so long as the fluid bore 285 of the gate 485 is at least partially aligned with the fluid bores 145, 175, 230, and 250 (i.e., the gate valve 100 is not in the fully-closed configuration), the process fluid carries away the excess grease to reduce the fluid pressure of the grease remaining in the valve cavity 130.

Alternatively, in some embodiments, the flow valve 450 may be omitted so that the fluid pressure in the valve cavity 130 need not exceed the fluid pressure in the fluid bore 285 of the gate 485 by the threshold amount in order for the grease to flow (i.e., be communicated) into the passage 500 at the side surface 274c, through the passage 500, into the passage 460 at the side surface 274d, through the passage 460, into the passage 445, through the passage 445, and into the fluid bore 285 of the gate 485. Accordingly, in such embodiments, the gate 485 from which the flow valve 450 is omitted ensures that the gate valve 100 (which includes the gate 485 but not the flow valve 450) is pressure balanced by equalizing the pressure between the valve cavity 130 and the fluid bore 285 of the gate 485.

In several embodiments, with or without the flow valve 450, the gate 485 reduces the closing torque of the gate valve 100, which includes the gate 485, by reducing the fluid pressure of the grease remaining in the valve cavity 130 (i.e., via pressure balancing by either preventing the pressure differential across the flow valve 450 from exceeding a predetermined pressure differential or equalizing the pressure without the flow valve 450). Moreover, any safety hazard associated with over-pressurization of the valve cavity 130 that might otherwise result in failure of the valve body and/or other component(s) of the gate valve 100 is reduced.

In one or more embodiments, the valve cavity 130 is pressurized with a lubricant, such as grease and/or another type of lubricant, using a fluid transport device, which is operably associated with a grease container; in one embodiment, the fluid transport device is a pump or a compressor; in another embodiment, in addition, or instead of a pump or compressor, the fluid transport device is, or includes, a hydraulic power unit accumulator; in several embodiments, the fluid transport device provides pressurized grease to the valve cavity 130; in several embodiments, the fluid transport device provides pressurized grease to the valve cavity 130 via one or more fluid lines, one or more valves, one or more metering devices, or any combination thereof.

Figure 9B:
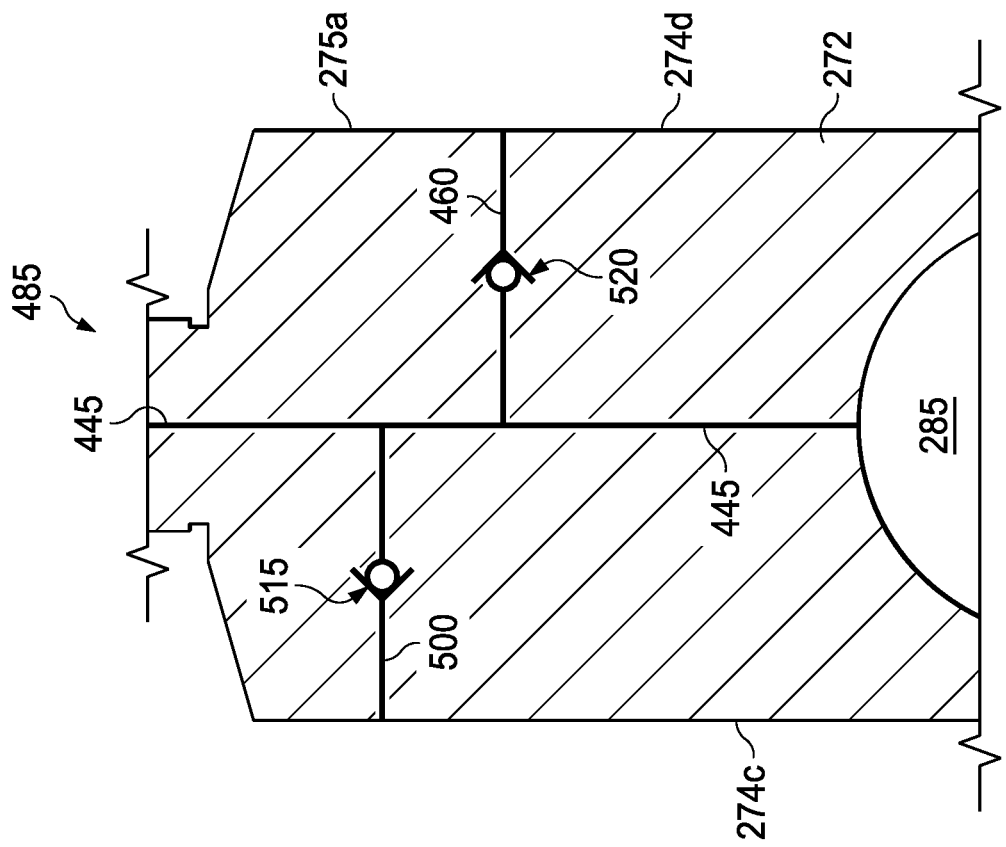
FIG. 9B is a cross-sectional view of the portion of the gate of FIG. 9A taken along the line 9B-9B of FIG. 9A, according to the one or more other embodiments of the present disclosure.
Figure 9A:
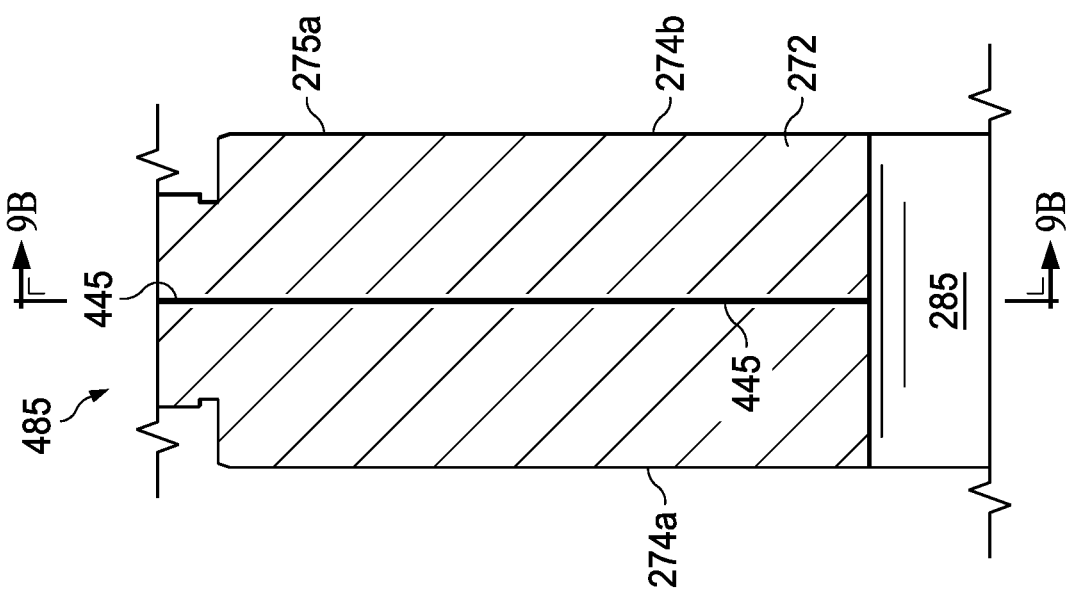
FIG. 9A is a cross-sectional view of the portion of the gate of FIGS. 8A and 8B, according to one or more other embodiments of the present disclosure.

Referring to FIGS. 9A and 9B, with continuing reference to FIGS. 8A and 8B, in one or more embodiments, instead of the flow valve 450 extending within the passage 445, a flow valve 515 extends within the passage 500 and a flow valve 520 extends within the passage 460. In several embodiments, the flow valves 515 and 520 are each substantially identical to the flow valve 450. In several embodiments, one or more of the flow valves 515 and 520 are check valves (or one-way valves). For example, one or more of the flow valves 515 and 520 may be or include diaphragm check valve(s), swing check valve(s), lift-check valve(s), ball check valve(s), or any combination thereof.

The flow valve(s) 515 and/or 520 are configured so that, during operation, when the fluid pressure in the valve cavity 130 exceeds the fluid pressure in the fluid bore 285 of the gate 485 by: a first threshold amount, the flow valve 515 provides pressure balancing, permitting the grease to flow (i.e., be communicated) into the passage 500 at the side surface 274c, through the flow valve 515, through the passage 500, into the passage 445, through the passage 445, and into the fluid bore 285 of the gate 485; and a second threshold amount, the flow valve 520 provides pressure balancing, permitting the grease to flow (i.e., be communicated) into the passage 460 at the side surface 274d, through the flow valve 520, through the passage 460, into the passage 445, through the passage 445, and into the fluid bore 285 of the gate 485. In some embodiments, the first and second threshold amounts by which the fluid pressure in the valve cavity 130 exceeds the fluid pressure in the fluid bore 285 of the gate 485 are the same so that the flow valves 515 and 520 simultaneously permit the grease to flow (i.e., be communicated) from the valve cavity 130 to the fluid bore 285 of the gate 485. In other embodiments, the first and second threshold amounts are different so that the flow valves 515 and 520 progressively permit more and more of the grease to flow (i.e., be communicated) from the valve cavity 130 to the fluid bore 285 of the gate 485 as the fluid pressure of the grease in the valve cavity 130 increases.

Accordingly, in some embodiments, the flow valves 515 and 520 ensure that the gate valve 100, which includes the gate 485 and the flow valves 515 and 520, is pressure balanced by preventing a pressure differential across the flow valves 515 and 520 from exceeding a predetermined pressure differential, that is, by preventing a pressure differential between the valve cavity 130 and the fluid bore 285 of the gate 485 from exceeding the predetermined pressure differential; in several embodiments, the predetermined pressure differential is or includes the first and/or second threshold amounts by which the fluid pressure in the valve cavity 130 exceeds the fluid pressure in the fluid bore 285 of the gate 485, thereby opening the respective flow valves 515 and 520 to permit the grease to flow (i.e., be communicated) towards the fluid bore 285; in other words, when the pressure differential across the flow valves 515 and 520 reaches the predetermined pressure differential, the flow valve(s) 515 and/or 520 open to permit the grease to flow (i.e., be communicated) towards the fluid bore 285 of the gate 485. Subsequently, so long as the fluid bore 285 of the gate 485 is at least partially aligned with the fluid bores 145, 175, 230, and 250 (i.e., the gate valve 100 is not in the fully-closed configuration), the process fluid carries away the excess grease to reduce the fluid pressure of the grease remaining in the valve cavity 130.

Alternatively, in some embodiments, the flow valves 515 and 520 may be omitted so that the fluid pressure in the valve cavity 130 need not exceed the fluid pressure in the fluid bore 285 of the gate 485 by: the first threshold amount in order for the grease to flow (i.e., be communicated) into the passage 500 at the side surface 274c, through the passage 500, into the passage 445, through the passage 445, and into the fluid bore 285 of the gate 485; or the second threshold amount in order for the grease to flow (i.e., be communicated) into the passage 460 at the side surface 274d, through the passage 460, into the passage 445, through the passage 445, and into the fluid bore 285 of the gate 485. Accordingly, in such embodiments, the gate 485 from which the flow valves 515 and 520 are omitted ensures that the gate valve 100 (which includes the gate 485 but not the flow valves 515 and 520) is pressure balanced by equalizing the pressure between the valve cavity 130 and the fluid bore 285 of the gate 485.

In several embodiments, with or without the flow valves 515 and 520, the gate 485 reduces the closing torque of the gate valve 100, which includes the gate 485, by reducing the fluid pressure of the grease remaining in the valve cavity 130 (i.e., via pressure balancing by either preventing the pressure differential across the flow valves 515 and 520 from exceeding a predetermined pressure differential or equalizing the pressure without the flow valves 515 and 520). Moreover, any safety hazard associated with over-pressurization of the valve cavity 130 that might otherwise result in failure of the valve body and/or other component(s) of the gate valve 100 is reduced.

Figure 10B:
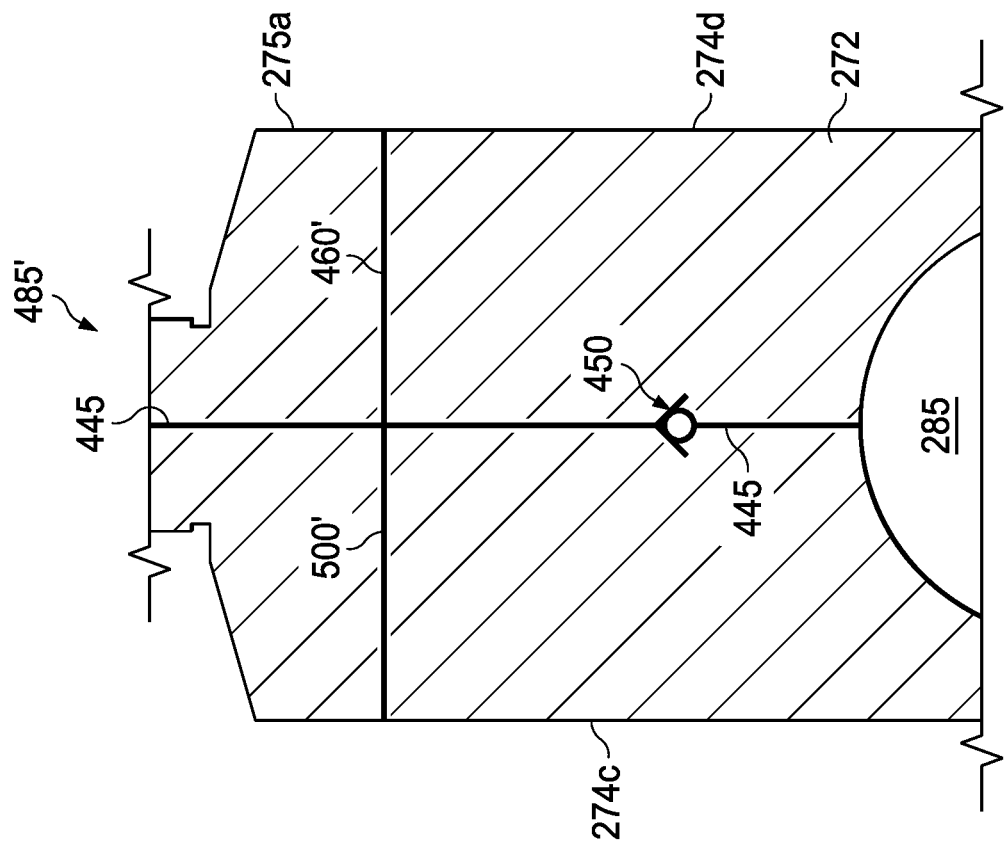
FIG. 10B is a cross-sectional view of the portion of the gate of FIG. 10A taken along the line 10B-10B of FIG. 10A, according to one or more embodiments of the present disclosure.
Figure 10A:
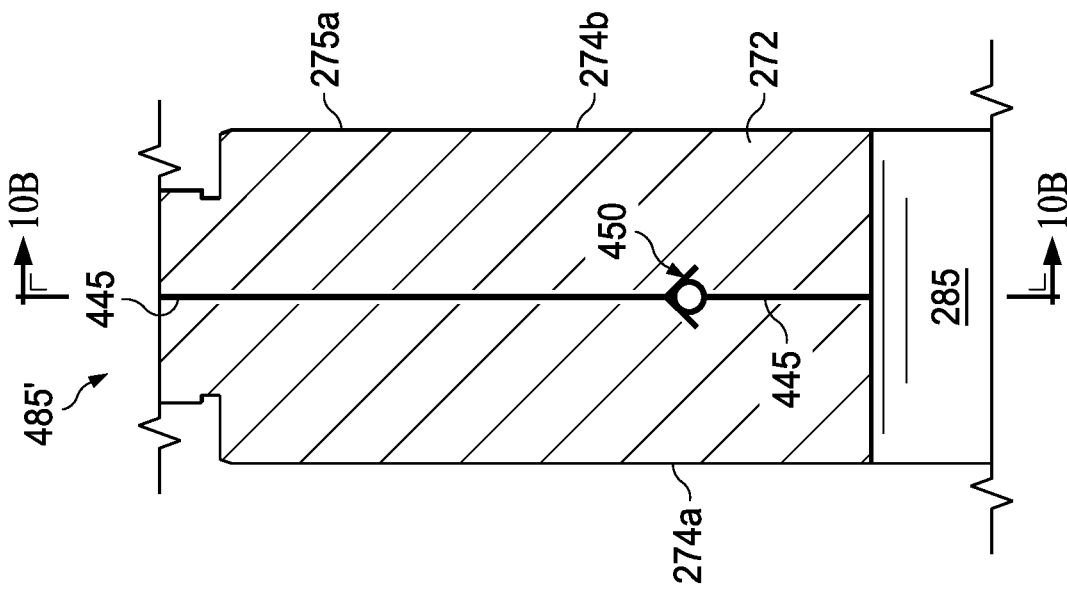
FIG. 10A is a cross-sectional view of a portion of a gate of the gate valve of FIGS. 1A and 1B, according to one or more embodiments of the present disclosure.

Referring to FIGS. 10A and 10B, with continuing reference to FIGS. 8A and 8B, in one or more embodiments, the gate 485 is omitted from the gate valve 100 and replaced with a gate 485'. The gate 485' includes several features that are substantially identical to corresponding features of the gate 485, which substantially identical features are given the same reference numerals. However, the passages 460 and 500 are omitted from the gate 485' and replaced with similar passages 460' and 500' that are aligned with each other so as to intersect the passage 445 at a same location along the length of the passage 445. In operation, the gate 485' is constrained at the side surface 274a by the valve seat 205a (shown in FIGS. 1B and 3) and, at the side surface 274b, by the valve seat 205b (shown in FIGS. 1A, 1B, and 3). The operation of the gate 485' is substantially identical to the operation of the gate 485 and, therefore, will not be described in further detail.

Referring to FIGS. 11A and 11B, with continuing reference to FIGS. 9A, 9B, 10A, and 10B, instead of the flow valve 450 extending within the passage 445, the flow valve 515 extends within the passage 500' and the flow valve 520 extends within the passage 460'. The operation of the flow valves 515 and 520 extending within the passages 500' and 460', respectively, of the gate 485' is substantially identical to the operation of the flow valves 515 and 520 extending within the passages 500 and 460, respectively, of the gate 485 and, therefore, will not be described in further detail.

Figure 12B:
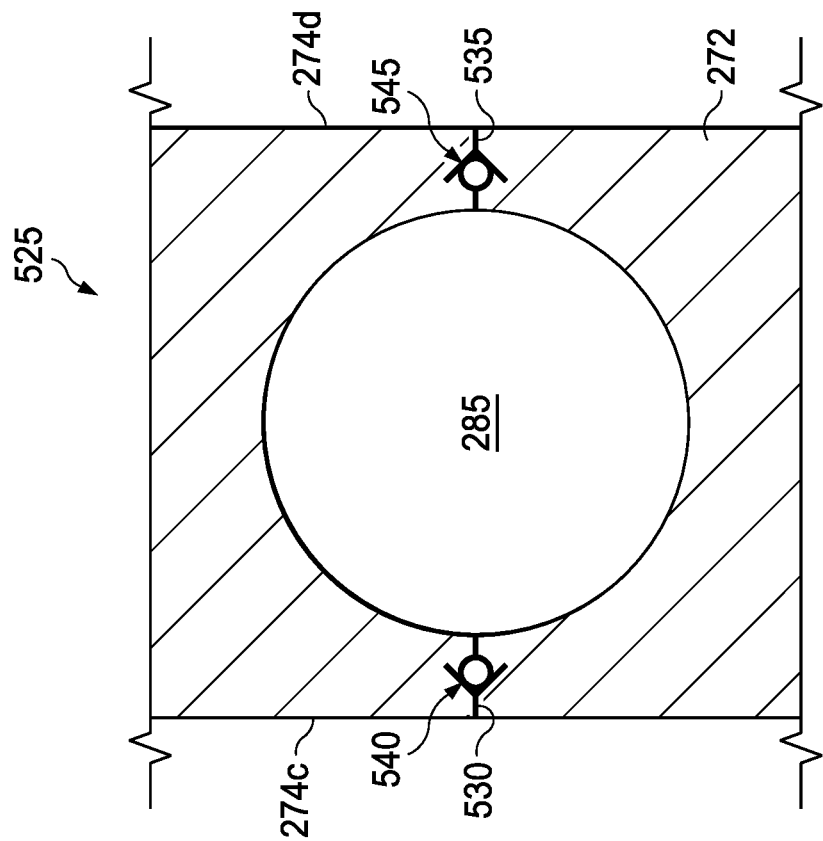
FIG. 12B is a cross-sectional view of the portion of the gate of FIG. 12A taken along the line 12B-12B of FIG. 12A, according to one or more embodiments of the present disclosure.
Figure 12A:
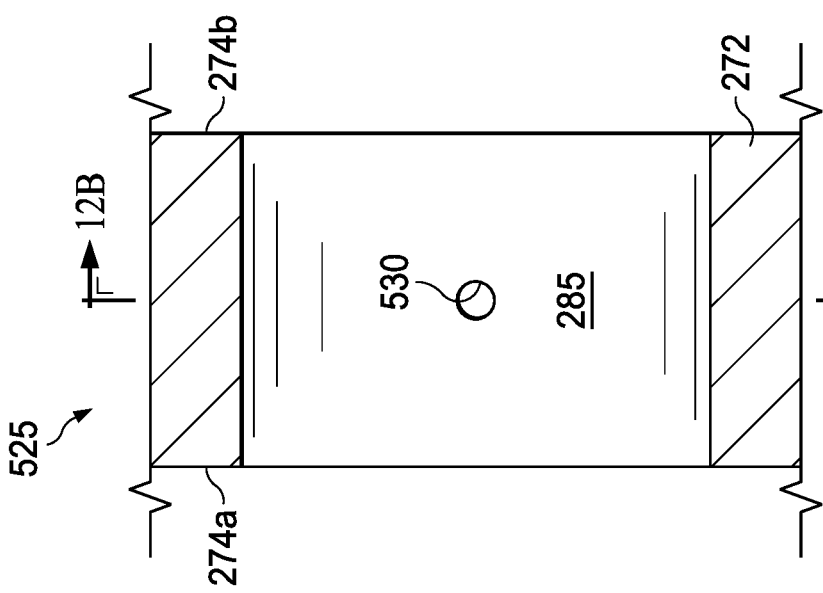
FIG. 12A is a cross-sectional view of a portion of a gate of the gate valve of FIGS. 1A and 1B, according to one or more embodiments of the present disclosure.

Referring to FIGS. 12A and 12B, with continuing reference to FIGS. 1-6, in one or more embodiments, the gate 260 is omitted from the gate valve 100 and replaced with a gate 525. The gate 525 includes several features that are substantially identical to corresponding features of the gate 260, which substantially identical features are given the same reference numerals. The gate 525 includes a passage (or passage segment) 530 extending through the side surface 274c, through the gate body 272, and into the fluid bore 285. In addition, or instead, the gate 525 includes a passage (or passage segment) 535 extending through the side surface 274d, through the gate body 272, and into the fluid bore 285. The passages 530 and 535 each extend angularly from the fluid bore 285. As shown in FIG. 12B, in one embodiment, the passages 530 and 535 each extend from the fluid bore 285 at an angle of 90 degrees, perpendicular to the fluid bore 285. In other embodiments, unlike that which is shown in FIG. 12B, the passages 530 and 535 extend angularly from the fluid bore 285 at an angle of other than 90 degrees, and thus are not perpendicular to the fluid bore 285. A flow valve 540 extends within the passage 530. In addition, or instead, a flow valve 545 extends within the passage 535. In several embodiments, the flow valves 540 and 545 are each substantially identical to the flow valve 450. In several embodiments, one or more of the flow valves 540 and 545 are check valves (or one-way valves). For example, one or more of the flow valves 540 and 545 may be or include diaphragm check valve(s), swing check valve(s), lift-check valve(s), ball check valve(s), or any combination thereof.

In operation, the gate 525 is constrained at the side surface 274a by the valve seat 205a (shown in FIGS. 1B and 3) and, at the side surface 274b, by the valve seat 205b (shown in FIGS. 1A, 1B, and 3). The valve cavity 130 (shown in FIGS. 1A, 1B, and 2) around the gate 525 is pressurized with grease (or another type of lubricant). Moreover, the fluid bore(s) 145, 175, 230, 250, and/or 285 (shown most clearly in FIG. 1B) of the gate valve 100 is/are pressurized with process fluid. During operation, the pressurized grease in the valve cavity 130 migrates between the gate 525 and the respective valve seats 205a and 205b (i.e., across the respective faces 205ab and 205bb) and into the process fluid flowing within the fluid bore(s) 145, 175, 230, 250, and/or 285. In several embodiments, the pressurized grease provides a barrier against solid particles (e.g., sand, fines, debris, etc.) within the process fluid, with the barrier preventing, or at least resisting, the solid particles from getting behind, or otherwise bypassing, the gate 525 and entering, for example, the valve cavity 130. The migration of the grease across the respective faces 205ab and 205bb facilitates: sealing engagement between the valve seats 205a and 205b and the gate 525; translational movement of the gate 525 between the fully-open configuration and the fully-closed configuration; resistance to solid particles (e.g., sand, fines, debris, etc.) within the process fluid from getting behind, or otherwise bypassing, the gate 525 and entering into, for example, the valve cavity 130; or any combination of the foregoing. To promote such migration, the grease in the valve cavity 130 may be pressurized to a greater degree than the process fluid flowing within the fluid bore(s) 145, 175, 230, 250, and/or 285.

During operation, the passages 530 and 535 are configured to prevent, or at least reduce, over-pressurization of the grease in the valve cavity 130. More particularly, when the fluid pressure in the valve cavity 130 exceeds the fluid pressure in the fluid bore 285 of the gate 525 by: a third threshold amount, the flow valve 540 provides pressure balancing, permitting the grease to flow (i.e., be communicated) into the passage 530 at the side surface 274*c*, through the flow valve 540, through the passage 530, and into the fluid bore 285 of the gate 525; and a fourth threshold amount, the flow valve 545 provides pressure balancing, permitting the grease to flow (i.e., be communicated) into the passage 535 at the side surface 274*d*, through the flow valve 545, through the passage 535, and into the fluid bore 285 of the gate 525. In some embodiments, the third and fourth threshold amounts by which the fluid pressure in the valve cavity 130 exceeds the fluid pressure in the fluid bore 285 of the gate 525 are the same so that the flow valves 540 and 545 simultaneously permit the grease to flow (i.e., be communicated) from the valve cavity 130 to the fluid bore 285 of the gate 525. In other embodiments, the third and fourth threshold amounts are different so that the flow valves 540 and 545 progressively permit more and more of the grease to flow (i.e., be communicated) from the valve cavity 130 to the fluid bore 285 of the gate 525 as the fluid pressure of the grease in the valve cavity 130 increases.

Accordingly, in some embodiments, the flow valves 540 and 545 ensure that the gate valve 100, which includes the gate 525 and the flow valves 540 and 545, is pressure balanced by preventing a pressure differential across the flow valves 540 and 545 from exceeding a predetermined pressure differential, that is, by preventing a pressure differential between the valve cavity 130 and the fluid bore 285 of the gate 525 from exceeding the predetermined pressure differential; in several embodiments, the predetermined pressure differential is or includes the third and/or fourth threshold amounts by which the fluid pressure in the valve cavity 130 exceeds the fluid pressure in the fluid bore 285 of the gate 525, thereby opening the respective flow valves 540 and 545 to permit the grease to flow (i.e., be communicated) towards the fluid bore 285; in other words, when the pressure differential across the flow valves 540 and 545 reaches the predetermined pressure differential, the flow valve(s) 540 and/or 545 open to permit the grease to flow (i.e., be communicated) towards the fluid bore 285 of the gate 525. Subsequently, so long as the fluid bore 285 of the gate 525 is at least partially aligned with the fluid bores 145, 175, 230, and 250 (i.e., the gate valve 100 is not in the fully-closed configuration), the process fluid carries away the excess grease to reduce the fluid pressure of the grease remaining in the valve cavity 130.

Alternatively, the flow valves 540 and 545 may be omitted so that the fluid pressure in the valve cavity 130 need not exceed the fluid pressure in the fluid bore 285 of the gate 525 by: the third threshold amount in order for the grease to flow (i.e., be communicated) into the passage 530 at the side surface 274*c*, through the passage 530, and into the fluid bore 285 of the gate 525; and the fourth threshold amount in order for the grease to flow (i.e., be communicated) into the passage 535 at the side surface 274*d*, through the passage 535, and into the fluid bore 285 of the gate 525. Accordingly, in such embodiments, the gate 525 from which the flow valves 540 and 545 are omitted ensures that the gate valve 100 (which includes the gate 525 but not the flow valves 540 and 545) is pressure balanced by equalizing the pressure between the valve cavity 130 and the fluid bore 285 of the gate 525.

In several embodiments, with or without the flow valves 540 and 545, the gate 525 reduces the closing torque of the gate valve 100, which includes the gate 525, by reducing the fluid pressure of the grease remaining in the valve cavity 130 (i.e., via pressure balancing by either preventing the pressure differential across the flow valves 540 and 545 from exceeding a predetermined pressure differential or equalizing the pressure without the flow valves 540 and 545). Moreover, any safety hazard associated with over-pressurization of the valve cavity 130 that might otherwise result in failure of the valve body and/or other component(s) of the gate valve 100 is reduced.

Referring to FIGS. 13A and 13B, with continuing reference to FIGS. 1-6, in one or more embodiments, the gate 260 is omitted from the gate valve 100 and replaced with a gate 550. The gate 550 includes several features that are substantially identical to corresponding features of the gate 260, which substantially identical features are given the same reference numerals. The gate 550 includes a passage (or passage segment) 555 extending through the end portion 275*b* of the gate body 272 and into the fluid bore 285. The passage 555 may be capped (not shown; e.g., by a threaded cap) opposite the fluid bore 285. The passage 555 extends perpendicular to the fluid bore 285. A flow valve 560 extends within the passage 555. In several embodiments, the flow valve 560 is substantially identical to the flow valve 450. In several embodiments, the flow valve 560 is a check valve (or a one-way valve). For example, the flow valve 560 may be or include a diaphragm check valve, a swing check valve, a lift-check valve, a ball check valve, or any combination thereof.

The gate 550 includes a passage (or passage segment) 565 extending through the side surface 274*a*, through the gate body 272, and into the passage 555. In addition, or instead, the gate 550 includes a passage (or passage segment) 570 extending through the side surface 274*b*, through the gate body 272, and into the passage 555. The passages 565 and 570 are aligned with each other so as to intersect the passage 555 at a same location along a length of the passage 555. The passages 565 and 570 each extend angularly from the passage 555. As shown in FIG. 13A, in one embodiment, the passages 565 and 570 each extend from the passage 555 at an angle of 90 degrees, perpendicular to the passage 555, and parallel to the fluid bore 285. In other embodiments, unlike that which is shown in FIG. 13A, the passages 565 and 570 extend angularly from the passage 555 at an angle of other than 90 degrees, and thus are not perpendicular to the passage 555. In addition, or instead, the gate 550 includes a passage (or passage segment) 575 extending through the side surface 274*c*, through the gate body 272, and into the passage 555. In addition, or instead, the gate 550 includes a passage (or passage segment) 580 extending through the side surface 274*d*, through the gate body 272, and into the passage 555. The passages 575 and 580 are aligned with each other so as to intersect the passage 555 at a same location along the length of the passage 555. As shown in FIG. 13B, in one embodiment, the passages 575 and 580 each extend from the passage 555 at an angle of other than 90 degrees, and thus are not perpendicular to the passage 555 nor parallel to the fluid bore 285.

In operation, the gate 550 is constrained at the side surface 274*a* by the valve seat 205*a* (shown in FIGS. 1B and 3) and, at the side surface 274*b*, by the valve seat 205*b* (shown in FIGS. 1A, 1B, and 3). The valve cavity 130 (shown in FIGS. 1A, 1B, and 2) around the gate 550 is pressurized with grease (or another type of lubricant). Moreover, the fluid bore(s) 145, 175, 230, 250, and/or 285 (shown most clearly in FIG. 1B) of the gate valve 100 is/are pressurized with process fluid. During operation, the pressurized grease in the valve cavity 130 migrates between the gate 550 and the respective valve seats 205*a* and 205*b* (i.e., across the respective faces 205*ab* and 205*bb*) and into the process fluid flowing within the fluid bore(s) 145, 175, 230, 250, and/or 285. In several embodiments, the pressurized grease provides a barrier against solid particles (e.g., sand, fines, debris, etc.) within the process fluid, with the barrier preventing, or at least resisting, the solid particles from getting behind, or otherwise bypassing, the gate 550 and entering, for example, the valve cavity 130. The migration of the grease across the respective faces 205ab and 205bb facilitates: sealing engagement between the valve seats 205a and 205b and the gate 550; translational movement of the gate 550 between the fully-open configuration and the fully-closed configuration; resistance to solid particles (e.g., sand, fines, debris, etc.) within the process fluid from getting behind, or otherwise bypassing, the gate 550 and entering into, for example, the valve cavity 130; or any combination of the foregoing. To promote such migration, the grease in the valve cavity 130 may be pressurized to a greater degree than the process fluid flowing within the fluid bore(s) 145, 175, 230, 250, and/or 285.

During operation, the passages 555, 565, 570, 575, and 580 are configured to prevent, or at least reduce, over-pressurization of the grease in the valve cavity 130. More particularly, when the fluid pressure in the valve cavity 130 exceeds the fluid pressure in the fluid bore 285 of the gate 550 by a threshold amount, the flow valve 560 provides pressure balancing, permitting the grease to flow (i.e., be communicated) into the passage 565 at the side surface 274a, through the passage 565, into the passage 570 at the side surface 274b, through the passage 570, into the passage 575 at the side surface 274c, through the passage 575, into the passage 580 at the side surface 274d, through the passage 580, into the passage 555, through the flow valve 560, through the passage 555, and into the fluid bore 285 of the gate 550.

Accordingly, in some embodiments, the flow valve 560 ensures that the gate valve 100, which includes the gate 550 and the flow valve 560, is pressure balanced by preventing a pressure differential across the flow valve 560 from exceeding a predetermined pressure differential, that is, by preventing a pressure differential between the valve cavity 130 and the fluid bore 285 of the gate 550 from exceeding the predetermined pressure differential; in several embodiments, the predetermined pressure differential is the threshold amount by which the fluid pressure in the valve cavity 130 exceeds the fluid pressure in the fluid bore 285 of the gate 550, thereby opening the flow valve 560 to permit the grease to flow (i.e., be communicated) towards the fluid bore 285; in other words, when the pressure differential across the flow valve 560 reaches the predetermined pressure differential, the flow valve 560 opens to permit the grease to flow (i.e., be communicated) towards the fluid bore 285 of the gate 550. Subsequently, so long as the fluid bore 285 of the gate 550 is at least partially aligned with the fluid bores 145, 175, 230, and 250 (i.e., the gate valve 100 is not in the fully-closed configuration), the process fluid carries away the excess grease to reduce the fluid pressure of the grease remaining in the valve cavity 130.

Alternatively, in some embodiments, the flow valve 560 may be omitted so that the fluid pressure in the valve cavity 130 need not exceed the fluid pressure in the fluid bore 285 of the gate 550 by the threshold amount in order for the grease to flow (i.e., be communicated) into the passage 565 at the side surface 274a, through the passage 565, into the passage 570 at the side surface 274b, through the passage 570, into the passage 575 at the side surface 274c, through the passage 575, into the passage 580 at the side surface 274d, through the passage 580, into the passage 555, through the passage 555, and into the fluid bore 285 of the gate 550. Accordingly, in such embodiments, the gate 550 from which the flow valve 560 is omitted ensures that the gate valve 100 (which includes the gate 550 but not the flow valve 560) is pressure balanced by equalizing the pressure between the valve cavity 130 and the fluid bore 285 of the gate 550.

In several embodiments, with or without the flow valve 560, the gate 550 reduces the closing torque of the gate valve 100, which includes the gate 550, by reducing the fluid pressure of the grease remaining in the valve cavity 130 (i.e., via pressure balancing by either preventing the pressure differential across the flow valve 560 from exceeding a predetermined pressure differential or equalizing the pressure without the flow valve 560). Moreover, any safety hazard associated with over-pressurization of the valve cavity 130 that might otherwise result in failure of the valve body and/or other component(s) of the gate valve 100 is reduced.

Figure 14B:
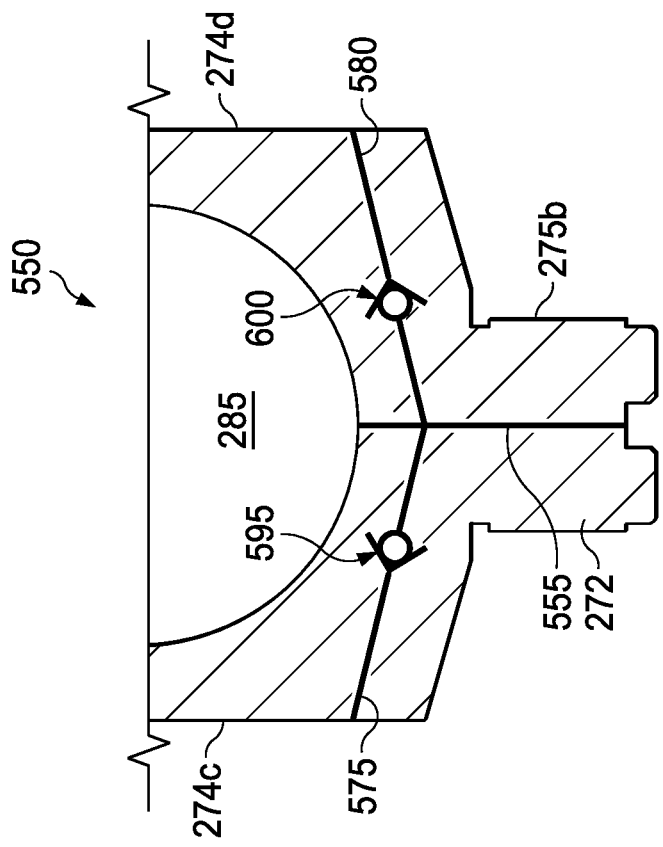
FIG. 14B is a cross-sectional view of the portion of the gate of FIG. 14A taken along the line 14B-14B of FIG. 14A, according to the one or more other embodiments of the present disclosure.
Figure 14A:
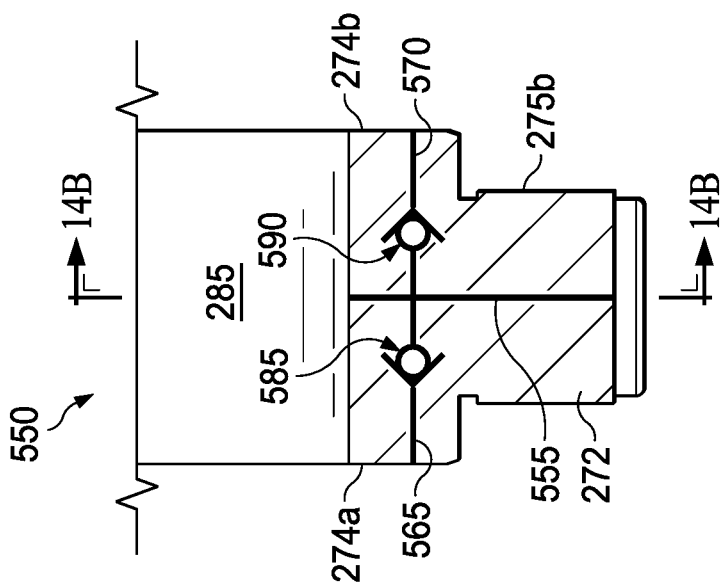
FIG. 14A is a cross-sectional view of the portion of the gate of the gate valve of FIGS. 13A and 13B, according to one or more other embodiments of the present disclosure.

Referring to FIGS. 14A and 14B, with continuing reference to FIGS. 13A and 13B, in one or more embodiments, instead of the flow valve 560 extending within the passage 555, a flow valve 585 extends within the passage 565, a flow valve 590 extends within the passage 570, a flow valve 595 extends within the passage 575, and a flow valve 600 extends within the passage 580. In several embodiments, the flow valves 585, 590, 595, and 600 are each substantially identical to the flow valve 450. In several embodiments, one or more of the flow valves 585, 590, 595, and 600 are check valves (or one-way valves). For example, one or more of the flow valves 585, 590, 595, and 600 may be or include diaphragm check valve(s), swing check valve(s), lift-check valve(s), ball check valve(s), or any combination thereof.

The flow valve(s) 585, 590, 595, and/or 600 are configured so that, during operation, when the fluid pressure in the valve cavity 130 exceeds the fluid pressure in the fluid bore 285 of the gate 550 by: a fifth threshold amount, the flow valve 585 provides pressure balancing, permitting the grease to flow (i.e., be communicated) into the passage 565 at the side surface 274a, through the flow valve 585, through the passage 565, into the passage 555, through the passage 555, and into the fluid bore 285 of the gate 550; an sixth threshold amount, the flow valve 590 provides pressure balancing, permitting the grease to flow (i.e., be communicated) into the passage 570 at the side surface 274b, through the flow valve 590, through the passage 570, into the passage 555, through the passage 555, and into the fluid bore 285 of the gate 550; a seventh threshold amount, the flow valve 595 provides pressure balancing, permitting the grease to flow (i.e., be communicated) into the passage 575 at the side surface 274c, through the flow valve 595, through the passage 575, into the passage 555, through the passage 555, and into the fluid bore 285 of the gate 550; and an eighth threshold amount, the flow valve 600 provides pressure balancing, permitting the grease to flow (i.e., be communicated) into the passage 580 at the side surface 274d, through the flow valve 600, through the passage 580, into the passage 555, through the passage 555, and into the fluid bore 285 of the gate 550. In some embodiments, the fifth, sixth, seventh, and eighth threshold amounts by which the fluid pressure in the valve cavity 130 exceeds the fluid pressure in the fluid bore 285 of the gate 550 are the same so that the flow valves 585, 590, 595, and 600 simultaneously permit the grease to flow (i.e., be communicated) from the valve cavity 130 to the fluid bore 285 of the gate 550. In other embodiments, the fifth, sixth, seventh, and eighth threshold amounts are different so that the flow valves 585, 590, 595, and 600 progressively permit more and more of the grease to flow (i.e., be communicated) from the valve cavity 130 to the fluid bore 285 of the gate 550 as the fluid pressure of the grease in the valve cavity 130 increases.

Accordingly, in some embodiments, the flow valves 585, 590, 595, and 600 ensure that the gate valve 100, which includes the gate 550 and the flow valves 585, 590, 595, and 600, is pressure balanced by preventing a pressure differential across the flow valves 585, 590, 595, and 600 from exceeding a predetermined pressure differential, that is, by preventing a pressure differential between the valve cavity 130 and the fluid bore 285 of the gate 550 from exceeding the predetermined pressure differential; in several embodiments, the predetermined pressure differential is or includes the fifth, sixth, seventh, and/or eighth threshold amounts by which the fluid pressure in the valve cavity 130 exceeds the fluid pressure in the fluid bore 285 of the gate 550, thereby opening the respective flow valves 585, 590, 595, and 600 to permit the grease to flow (i.e., be communicated) towards the fluid bore 285; in other words, when the pressure differential across the flow valves 585, 590, 595, and 600 reaches the predetermined pressure differential, the flow valve(s) 585, 590, 595, and/or 600 open to permit the grease to flow (i.e., be communicated) towards the fluid bore 285 of the gate 550. Subsequently, so long as the fluid bore 285 of the gate 550 is at least partially aligned with the fluid bores 145, 175, 230, and 250 (i.e., the gate valve 100 is not in the fully-closed configuration), the process fluid carries away the excess grease to reduce the fluid pressure of the grease remaining in the valve cavity 130.

Alternatively, in some embodiments, the flow valves 585, 590, 595, and 600 may be omitted so that the fluid pressure in the valve cavity 130 need not exceed the fluid pressure in the fluid bore 285 of the gate 550 by: the fifth threshold amount in order for the grease to flow (i.e., be communicated) into the passage 565 at the side surface 274a, through the passage 565, into the passage 555, through the passage 555, and into the fluid bore 285 of the gate 550; the sixth threshold amount in order for the grease to flow (i.e., be communicated) into the passage 570 at the side surface 274b, through the passage 570, into the passage 555, through the passage 555, and into the fluid bore 285 of the gate 550; the seventh threshold amount in order for the grease to flow (i.e., be communicated) into the passage 575 at the side surface 274c, through the passage 575, into the passage 555, through the passage 555, and into the fluid bore 285 of the gate 550; and the eighth threshold amount in order for the grease to flow (i.e., be communicated) into the passage 580 at the side surface 274d, through the passage 580, into the passage 555, through the passage 555, and into the fluid bore 285 of the gate 550. Accordingly, in such embodiments, the gate 550 from which the flow valves 585, 590, 595, and 600 are omitted ensures that the gate valve 100 (which includes the gate 550 but not the flow valves 585, 590, 595, and 600) is pressure balanced by equalizing the pressure between the valve cavity 130 and the fluid bore 285 of the gate 550.

In several embodiments, with or without the flow valves 585, 590, 595, and 600, the gate 550 reduces the closing torque of the gate valve 100, which includes the gate 550, by reducing the fluid pressure of the grease remaining in the valve cavity 130 (i.e., via pressure balancing by either preventing the pressure differential across the flow valves 585, 590, 595, and 600 from exceeding a predetermined pressure differential or equalizing the pressure without the flow valves 585, 590, 595, and 600). Moreover, any safety hazard associated with over-pressurization of the valve cavity 130 that might otherwise result in failure of the valve body and/or other component(s) of the gate valve 100 is reduced.

A first apparatus includes a gate, the gate including a gate body, a first fluid bore extending through the gate body, and a passage extending through the gate body from the first fluid bore. The passage includes a first segment extending into the gate body from the first fluid bore, and a second segment extending angularly from the first segment and through the gate body. In one or more embodiments, the apparatus further includes a valve body defining a valve cavity adapted to be pressurized with lubricant; wherein the gate is adapted to extend within the valve cavity, and wherein, when the gate extends within the valve cavity and the valve cavity around the gate is pressurized with the lubricant, the passage is adapted to communicate at least a portion of the lubricant from the valve cavity to the first fluid bore. In one or more embodiments, the apparatus further includes first and second valve seats adapted to extend within the valve cavity; wherein the gate body defines opposing first and second side surfaces through which the first fluid bore extends, and wherein the gate is adapted to be constrained in the valve cavity at the first side surface by the first valve seat, and at the second side surface by the second valve seat. In one or more embodiments, the first valve seat includes a first seat body and a second fluid bore extending through the first seat body, the second valve seat includes a second seat body and a third fluid bore extending through the second seat body, and, when the gate is constrained in the valve cavity at the first side surface by the first valve seat, and at the second side surface by the second valve seat, the gate is translationally movable between: an open configuration, in which the first fluid bore of the gate is at least partially aligned with the second fluid bore of the first valve seat, and is at least partially aligned with the third fluid bore of the second valve seat; and a closed configuration, in which the first fluid bore of the gate is neither partially nor completely aligned with the second fluid bore of the first valve seat, and is neither partially nor completely aligned with the third fluid bore of the second valve seat. In one or more embodiments, the passage is adapted to communicate the at least a portion of the lubricant from the valve cavity to the first fluid bore only when the gate is in the open configuration. In one or more embodiments, the second segment of the passage extends through a surface of the gate body that is different from each of the first and second side surfaces. In one or more embodiments, the passage further includes a third segment extending angularly from the first segment and through the gate body. In one or more embodiments, the third segment of the passage extends through another surface of the gate body that is different from each of the first and second side surfaces. In one or more embodiments, the gate body further defines opposing third and fourth side surfaces each extending between the opposing first and second side surfaces, the third side surface being the surface through which the second segment extends, and the third segment of the passage extends through either the third side surface or the fourth side surface. In one or more embodiments, the second and third segments of the passage are offset from each other so as to intersect the first segment of the passage at different locations along a length of the first segment. In one or more embodiments, the gate body further defines opposing third and fourth side surfaces each extending between the opposing first and second side surfaces, and the second segment of the passage extends through the third side surface of the gate body. In one or more embodiments, the passage further includes a third segment extending angularly from the first segment and through the gate body, and the third segment of the passage extends through the fourth side surface of the gate body. In one or more embodiments, the second and third segments of the passage are offset from each other so as to intersect the first segment of the passage at different locations along a length of the first segment. In one or more embodiments, the first fluid bore extends through the gate body at or near a first end portion of the gate body, and the first segment of the passage extends into the gate body from the first fluid bore toward the first end portion of the gate body and away from an opposing second end portion of the gate body. In one or more embodiments, the first fluid bore extends through the gate body at or near a first end portion of the gate body, and the first segment of the passage extends into the gate body from the first fluid bore toward an opposing second end portion of the gate body and away from the first end portion of the gate body. In one or more embodiments, the apparatus further includes a flow valve positioned within the passage. In one or more embodiments, the flow valve is configured to: block fluid flow from the first fluid bore and through the flow valve; and permit fluid flow through the flow valve and into the first fluid bore when a pressure differential across the flow valve reaches a predetermined pressure differential. In one or more embodiments, the flow valve is positioned within the first segment of the passage. In one or more embodiments, the flow valve is positioned with the second segment of the passage.

A second apparatus includes a gate, the gate including a gate body, a first fluid bore extending through the gate body, a passage extending through the gate body from the first fluid bore, and a flow valve positioned within the passage. In one or more embodiments, the flow valve is configured to: block fluid flow from the first fluid bore and through the flow valve; and permit fluid flow through the flow valve and into the first fluid bore when a pressure differential across the flow valve reaches a predetermined pressure differential. In one or more embodiments, the flow valve is a one-way valve. In one or more embodiments, the flow valve is a check valve. In one or more embodiments, the flow valve includes a valve seat, a valve member, and a biasing member adapted to urge the valve member against the valve seat. In one or more embodiments, the apparatus further includes a valve body defining a valve cavity adapted to be pressurized with lubricant; wherein the gate is adapted to extend within the valve cavity, and wherein, when the gate extends within the valve cavity and the valve cavity is pressurized with the lubricant, the passage and the flow valve are adapted to communicate at least a portion of the lubricant from the valve cavity to the first fluid bore via the flow valve. In one or more embodiments, the apparatus further includes first and second valve seats adapted to extend within the valve cavity; wherein the gate body defines opposing first and second side surfaces through which the first fluid bore extends, and wherein the gate is adapted to be constrained in the valve cavity at the first side surface by the first valve seat, and at the second side surface by the second valve seat. In one or more embodiments, the first valve seat includes a first seat body and a second fluid bore extending through the first seat body, the second valve seat includes a second seat body and a third fluid bore extending through the second seat body, and, when the gate is constrained in the valve cavity at the first side surface by the first valve seat, and at the second side surface by the second valve seat, the gate is translationally movable between: an open configuration, in which the first fluid bore of the gate is at least partially aligned with the second fluid bore of the first valve seat, and is at least partially aligned with the third fluid bore of the second valve seat; and a closed configuration, in which the first fluid bore of the gate is neither partially nor completely aligned with the second fluid bore of the first valve seat, and is neither partially nor completely aligned with the third fluid bore of the second valve seat. In one or more embodiments, the passage and the flow valve are adapted to communicate the at least a portion of the lubricant from the valve cavity to the first fluid bore via the flow valve only when the gate is in the open configuration. In one or more embodiments, the passage includes: a first segment extending into the gate body from the first fluid bore; and a second segment extending angularly from the first segment and through the gate body. In one or more embodiments, the flow valve is positioned within the first segment of the passage. In one or more embodiments, the flow valve is positioned within the second segment of the passage.

A first method includes extending a gate body within a valve cavity, wherein a fluid bore extends through the gate body and a passage extends from the fluid bore, through the gate body, and to the valve cavity; preventing, or at least resisting, solid particles from entering the valve cavity, including pressurizing, with a lubricant, the valve cavity within which the gate body extends; and balancing respective pressures in the valve cavity and the fluid bore. In one or more embodiments, balancing the respective pressures in the valve cavity and the fluid bore includes equalizing, via the passage, the respective pressures in the valve cavity and the fluid bore. In one or more embodiments, balancing the respective pressures in the valve cavity and the fluid bore includes communicating at least a portion of the lubricant from the valve cavity to the fluid bore, via the passage, when a pressure differential between the valve cavity and the fluid bore reaches a predetermined pressure differential. In one or more embodiments, balancing the respective pressures in the valve cavity and the fluid bore includes communicating at least a portion of the lubricant from the valve cavity to the fluid bore via the passage. In one or more embodiments, balancing the respective pressures in the valve cavity and the fluid bore further includes blocking fluid flow from the fluid bore and towards the valve cavity via the passage. In one or more embodiments, the at least a portion of the lubricant is communicated from the valve cavity to the fluid bore, via the passage, when a pressure differential between the valve cavity and the fluid bore reaches a predetermined pressure differential. In one or more embodiments, the at least a portion of the lubricant is communicated from the valve cavity to the fluid bore via the passage and a flow valve positioned within the passage. In one or more embodiments, communicating the at least a portion of the lubricant from the valve cavity to the fluid bore includes: communicating the at least a portion of the lubricant from the valve cavity to a first segment of the passage via a second segment of the passage, the first segment of the passage extending into the gate body from the fluid bore, the second segment of the passage extending angularly from the first segment of the passage and through the gate body; and communicating the at least a portion of the lubricant through the first segment of the passage and into the fluid bore. In one or more embodiments, the at least a portion of the lubricant is communicated from the valve cavity to the fluid bore via the passage and also via a flow valve, the flow valve being positioned in either the first segment or the second segment.

A third apparatus includes a gate, the gate including: a gate body; a first fluid bore extending through the gate body; and a passage extending through the gate body from the first fluid bore; wherein: (i) the passage includes a first segment extending into the gate body from the first fluid bore, and a second segment extending angularly from the first segment and through the gate body; and/or (ii) the apparatus further includes a flow valve positioned within the passage. In one or more embodiments, the apparatus includes a valve body within which the gate extends, the valve body defining a valve cavity adapted to be pressurized with lubricant; and first and second valve seats extending within the valve cavity; wherein the gate body defines opposing first and second side surfaces through which the first fluid bore extends; wherein the gate is constrained in the valve cavity at the first side surface by the first valve seat, and at the second side surface by the second valve seat; wherein the first valve seat includes a first seat body and a second fluid bore extending through the first seat body; wherein the second valve seat includes a second seat body and a third fluid bore extending through the second seat body; and wherein the gate is translationally movable between: an open configuration, in which the first fluid bore of the gate is at least partially aligned with the second fluid bore of the first valve seat, and is at least partially aligned with the third fluid bore of the second valve seat; and a closed configuration, in which the first fluid bore of the gate is neither partially nor completely aligned with the second fluid bore of the first valve seat, and is neither partially nor completely aligned with the third fluid bore of the second valve seat. In one or more embodiments, at least a portion of the lubricant is adapted to be communicated from the valve cavity to the first fluid bore via the passage. In one or more embodiments, the apparatus wherein (i); wherein the gate body defines opposing first and second side surfaces through which the first fluid bore extends; and wherein the second segment of the passage extends through a surface of the gate body that is different from each of the first and second side surfaces. In one or more embodiments, the passage further includes a third segment extending angularly from the first segment and through the gate body. In one or more embodiments, the third segment of the passage extends through another surface of the gate body that is different from each of the first and second side surfaces. In one or more embodiments, the second and third segments of the passage are offset from each other so as to intersect the first segment of the passage at different locations along a length of the first segment. In one or more embodiments, the apparatus wherein (i); wherein the gate body defines opposing first and second side surfaces through which the first fluid bore extends; wherein the gate body further defines opposing third and fourth side surfaces each extending between the opposing first and second side surfaces; and wherein the second segment of the passage extends through the third side surface of the gate body. In one or more embodiments, the passage further includes a third segment extending angularly from the first segment and through the gate body, and wherein the third segment of the passage extends through the fourth side surface of the gate body. In one or more embodiments, the apparatus wherein (i); and wherein the first fluid bore extends through the gate body at or near a first end portion of the gate body, and wherein the first segment of the passage extends into the gate body from the first fluid bore toward either: the first end portion of the gate body and away from an opposing second end portion of the gate body; or a second end portion of the gate body and away from the first end portion of the gate body, the second end portion of the gate body opposing the first end portion of the gate body. In one or more embodiments, the apparatus wherein (ii); and wherein the flow valve is configured to: block fluid flow from the first fluid bore and through the flow valve; and permit fluid flow through the flow valve and into the first fluid bore when a pressure differential across the flow valve reaches a predetermined pressure differential. In one or more embodiments, the apparatus wherein (ii); and wherein the flow valve is a one-way valve. In one or more embodiments, the apparatus wherein (ii); and wherein the flow valve includes a valve seat, a valve member, and a biasing member adapted to urge the valve member against the valve seat. In one or more embodiments, the apparatus wherein (i). In one or more embodiments, the apparatus wherein (ii). In one or more embodiments, the apparatus wherein (i) and (ii). In one or more embodiments, the flow valve is positioned within either: the first segment of the passage; or the second segment of the passage.

A second method includes providing a valve body, the valve body defining a valve cavity within which a gate body extends, wherein a fluid bore extends through the gate body and a passage extends from the fluid bore, through the gate body, and to the valve cavity; preventing, or at least resisting, solid particles from entering the valve cavity, including pressurizing, with a lubricant, the valve cavity within which the gate body extends; and balancing respective pressures in the valve cavity and the fluid bore. In one or more embodiments, balancing the respective pressures in the valve cavity and the fluid bore includes equalizing, via the passage, the respective pressures in the valve cavity and the fluid bore. In one or more embodiments, balancing the respective pressures in the valve cavity and the fluid bore includes communicating at least a portion of the lubricant from the valve cavity to the fluid bore via the passage. In one or more embodiments, balancing the respective pressures in the valve cavity and the fluid bore further includes blocking fluid flow from the fluid bore and towards the valve cavity via the passage. In one or more embodiments, the at least a portion of the lubricant is communicated from the valve cavity to the fluid bore, via the passage, when a pressure differential between the valve cavity and the fluid bore reaches a predetermined pressure differential. In one or more embodiments, the at least a portion of the lubricant is communicated from the valve cavity to the fluid bore via the passage and a flow valve positioned within the passage. In one or more embodiments, communicating the at least a portion of the lubricant from the valve cavity to the fluid bore via the passage includes: communicating the at least a portion of the lubricant from the valve cavity to a first segment of the passage via a second segment of the passage, the first segment of the passage extending into the gate body from the fluid bore, the second segment of the passage extending angularly from the first segment of the passage and through the gate body; and communicating the at least a portion of the lubricant through the first segment of the passage and into the fluid bore.

A fourth apparatus includes a valve body, the valve body defining a valve cavity; a gate body extending within the valve cavity, wherein a fluid bore extends through the gate body; means for preventing, or at least resisting, solid particles from entering the valve cavity, including means for pressurizing, with a lubricant, the valve cavity within which the gate body extends; and means for balancing respective pressures in the valve cavity and the fluid bore. In one or more embodiments, means for balancing the respective pressures in the valve cavity and the fluid bore includes means for equalizing the respective pressures in the valve cavity and the fluid bore. In one or more embodiments, means for balancing the respective pressures in the valve cavity and the fluid bore includes means for communicating at least a portion of the lubricant from the valve cavity to the fluid bore. In one or more embodiments, means for balancing the respective pressures in the valve cavity and the fluid bore further includes means for blocking fluid flow from the fluid bore and towards the valve cavity. In one or more embodiments, the at least a portion of the lubricant is communicated from the valve cavity to the fluid bore when a pressure differential between the valve cavity and the fluid bore reaches a predetermined pressure differential.

It is understood that variations may be made in the foregoing without departing from the scope of the present disclosure.

In several embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method, comprising:
    providing a valve body and a gate apparatus, the valve body defining a valve cavity and the gate apparatus comprising:
        a gate, comprising:
            a gate body extending within the valve cavity, the gate body defining:
                opposing first and second side surfaces;
                opposing third and fourth side surfaces each extending between the opposing first and second side surfaces;
                and
                opposing first and second end portions each extending between the opposing first and second side surfaces, and between the opposing third and fourth side surfaces;
            a fluid bore extending through the gate body and through the first and second side surfaces; and
            a passage extending from the fluid bore, into the gate body, and to the valve cavity, the passage comprising:
                a first segment extending into the gate body from the fluid bore and toward the first end portion of the gate body;
                and
                a second segment extending angularly from the first segment and through the third side surface of the gate body;
            wherein the second segment is offset from the fluid bore along a length of the first segment;
        a flow valve positioned within the passage, the flow valve comprising:
            a valve seat;
            a valve member; and
            a biasing member adapted to urge the valve member against the valve seat;
            wherein the flow valve is configured to:
                block fluid flow from the fluid bore and through the flow valve; and
                permit fluid flow through the flow valve and into the fluid bore when a pressure differential across the flow valve reaches a predetermined pressure differential;
    preventing, or at least resisting, solid particles from entering the valve cavity, comprising pressurizing, with a lubricant, the valve cavity within which the gate body extends; and
    balancing respective pressures in the valve cavity and the fluid bore.

2. The method of claim 1, wherein balancing the respective pressures in the valve cavity and the fluid bore comprises equalizing, via the passage, the respective pressures in the valve cavity and the fluid bore.

3. The method of claim 1, wherein balancing the respective pressures in the valve cavity and the fluid bore comprises communicating at least a portion of the lubricant from the valve cavity to the fluid bore via the passage.

4. The method of claim 3, wherein balancing the respective pressures in the valve cavity and the fluid bore further comprises blocking fluid flow from the fluid bore and towards the valve cavity via the passage.

5. The method of claim 3, wherein the at least a portion of the lubricant is communicated from the valve cavity to the fluid bore, via the passage, when a pressure differential between the valve cavity and the fluid bore reaches a predetermined pressure differential.

6. The method of claim 3, wherein the at least a portion of the lubricant is communicated from the valve cavity to the fluid bore via the passage and a flow valve positioned within the passage.

7. The method of claim 3, wherein communicating the at least a portion of the lubricant from the valve cavity to the fluid bore via the passage comprises:
   communicating the at least a portion of the lubricant from the valve cavity to the first segment of the passage via the second segment of the passage; and
   communicating the at least a portion of the lubricant through the first segment of the passage and into the fluid bore.

8. An apparatus, comprising:
   a gate, comprising:
      a gate body, the gate body defining:
         opposing first and second side surfaces:
         opposing third and fourth side surfaces each extending between the opposing first and second side surfaces; and
         opposing first and second end portions each extending between the opposing first and second surfaces, and between the opposing third and fourth side surfaces;
      a first fluid bore extending through the gate body and through the first and second side surfaces; and
      a passage extending into the gate body from the first fluid bore, the passage comprising:
         a first segment extending into the gate body from the first fluid bore and toward the first end portion of the gate body; and
         a second segment extending angularly from the first segment and through the third side surface of the gate body;
      wherein the second segment is offset from the first fluid bore along a length of the first segment;
   a flow valve positioned within the passage, the flow valve comprising:
      a valve seat;
      a valve member; and
      a biasing member adapted to urge the valve member against the valve seat;
      wherein the flow valve is configured to:
         block fluid flow from the first fluid bore and through the flow valve; and
         permit fluid flow through the flow valve and into the first fluid bore when a pressure differential across the flow valve reaches a predetermined pressure differential.

9. The apparatus of claim 8, further comprising:
   a valve body within which the gate extends, the valve body defining a valve cavity adapted to be pressurized with lubricant; and
   first and second valve seats extending within the valve cavity;
   wherein the gate is constrained in the valve cavity at the first side surface by the first valve seat, and at the second side surface by the second valve seat;
   wherein the first valve seat comprises a first seat body and a second fluid bore extending through the first seat body;
   wherein the second valve seat comprises a second seat body and a third fluid bore extending through the second seat body; and
   wherein the gate is translationally movable between:
      an open configuration, in which the first fluid bore of the gate is at least partially aligned with the second fluid bore of the first valve seat, and is at least partially aligned with the third fluid bore of the second valve seat; and
      a closed configuration, in which the first fluid bore of the gate is neither partially nor completely aligned with the second fluid bore of the first valve seat, and is neither partially nor completely aligned with the third fluid bore of the second valve seat.

10. The apparatus of claim 9, wherein at least a portion of the lubricant is adapted to be communicated from the valve cavity to the first fluid bore via the passage when the gate is in the open configuration.

11. The apparatus of claim 8, wherein the passage further comprises a third segment extending angularly from the first segment and through the fourth side surface gate body.

12. The apparatus of claim 11, wherein the second and third segments of the passage are offset from each other so as to intersect the first segment of the passage at different locations along a length of the first segment.

13. The apparatus of claim 8, wherein (ii); and
   wherein the flow valve is a one-way valve.

14. The apparatus of claim 8, wherein the first fluid bore extends through the gate body at or near the second end portion of the gate body.

* * * * *

UNITED STATES PATENT AND TRADEMARK OFFICE
CERTIFICATE OF CORRECTION

PATENT NO. : 12,110,980 B2
APPLICATION NO. : 17/472260
DATED : October 8, 2024
INVENTOR(S) : Todd Roberts Page 1 of 1

It is certified that error appears in the above-identified patent and that said Letters Patent is hereby corrected as shown below:

In the Claims

Claim 8, Column 27, Line 18, replace "surfaces:" with -- surfaces; --

Claim 13, Column 28, Line 41, delete "(ii); and wherein" after -- claim 8, wherein --

Signed and Sealed this
Twenty-fourth Day of December, 2024

Derrick Brent
*Acting Director of the United States Patent and Trademark Office*